(12) United States Patent
Wu et al.

(10) Patent No.: US 12,451,727 B2
(45) Date of Patent: Oct. 21, 2025

(54) WIRELESS CHARGING SYSTEM

(71) Applicant: HONOR DEVICE CO., LTD., Guangdong (CN)

(72) Inventors: Yuan Wu, Shenzhen (CN); Wei Zhang, Shenzhen (CN); Feng Wang, Shenzhen (CN); Chao Wang, Shenzhen (CN); Lilie Zhao, Shenzhen (CN); Youjun Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 137 days.

(21) Appl. No.: 17/796,233

(22) PCT Filed: Feb. 10, 2022

(86) PCT No.: PCT/CN2022/075907
§ 371 (c)(1),
(2) Date: Jul. 28, 2022

(87) PCT Pub. No.: WO2022/206182
PCT Pub. Date: Oct. 6, 2022

(65) Prior Publication Data
US 2024/0186825 A1    Jun. 6, 2024

(30) Foreign Application Priority Data
Mar. 31, 2021  (CN) .......................... 202110352191.8

(51) Int. Cl.
*H02J 50/00* (2016.01)
*G06F 1/16* (2006.01)
(Continued)

(52) U.S. Cl.
CPC .......... *H02J 50/005* (2020.01); *G06F 1/1607* (2013.01); *G06F 1/189* (2013.01);
(Continued)

(58) Field of Classification Search
USPC ........................................................ 320/107
See application file for complete search history.

(56) References Cited

U.S. PATENT DOCUMENTS

| | | | |
|---|---|---|---|
| 6,473,076 B1 | 10/2002 | Thompson et al. | |
| 9,373,975 B2 | 6/2016 | Zhou | |

(Continued)

FOREIGN PATENT DOCUMENTS

| | | | |
|---|---|---|---|
| CN | 104115089 A | 10/2014 | |
| CN | 104518571 A | 4/2015 | |

(Continued)

*Primary Examiner* — Bryce M Aisaka
(74) *Attorney, Agent, or Firm* — Fish & Richardson P.C.

(57) ABSTRACT

This application provides a wireless charging system. The wireless charging system has the function of wirelessly charging an electronic stylus while receiving the electronic stylus. The wireless charging system includes a tablet computer, a wireless keyboard, and an electronic stylus. The wireless keyboard includes a keyboard body, a bracket for placing the tablet computer, and a connecting portion for movably connecting the keyboard body and the bracket. The tablet computer is provided with a first wireless charging sending device. The wireless keyboard is provided with a first wireless charging receiving device. The first wireless charging receiving device receives an electromagnetic signal sent by the first wireless charging sending device. The connecting portion includes a receiving cavity provided with an opening at an end and a second wireless charging sending device. The second wireless charging sending device is configured to wirelessly charge the electronic stylus received in the receiving cavity.

16 Claims, 14 Drawing Sheets

(51) Int. Cl.
*G06F 1/18* (2006.01)
*G06F 1/26* (2006.01)
*H02J 7/00* (2006.01)
*H02J 50/12* (2016.01)

(52) U.S. Cl.
CPC ............ *G06F 1/266* (2013.01); *H02J 7/0044* (2013.01); *H02J 50/12* (2016.02); *G06F 2200/1632* (2013.01)

(56) References Cited

U.S. PATENT DOCUMENTS

| | | | |
|---|---|---|---|
| 10,664,012 | B1 | 5/2020 | Zimmerman et al. |
| 10,892,625 | B1 | 1/2021 | Franklin et al. |
| 11,128,169 | B2 | 9/2021 | Kim et al. |
| 11,307,615 | B2 | 4/2022 | Zimmerman et al. |
| 2013/0279100 | A1* | 10/2013 | Fontana ................ G06F 1/1628 361/679.2 |
| 2015/0015492 | A1 | 1/2015 | Lee |
| 2017/0054328 | A1 | 2/2017 | Jung et al. |
| 2017/0222456 | A1 | 8/2017 | Perez et al. |
| 2020/0089341 | A1 | 3/2020 | Wang |
| 2021/0050742 | A1 | 2/2021 | Callan et al. |
| 2021/0278881 | A1 | 9/2021 | Atom et al. |
| 2021/0325933 | A1* | 10/2021 | Mehandjiysky ........ G06F 1/266 |

FOREIGN PATENT DOCUMENTS

| | | |
|---|---|---|
| CN | 106451822 A | 2/2017 |
| CN | 107045395 A | 8/2017 |
| CN | 107546803 A | 1/2018 |
| CN | 207067941 U | 3/2018 |
| CN | 109004752 A | 12/2018 |
| CN | 112514202 A | 3/2021 |
| CN | 112953037 A | 6/2021 |
| CN | 112698733 B | 7/2021 |
| CN | 113922515 A | 1/2022 |
| JP | 3225411 U | 3/2020 |
| WO | 2017131917 A1 | 8/2017 |

* cited by examiner

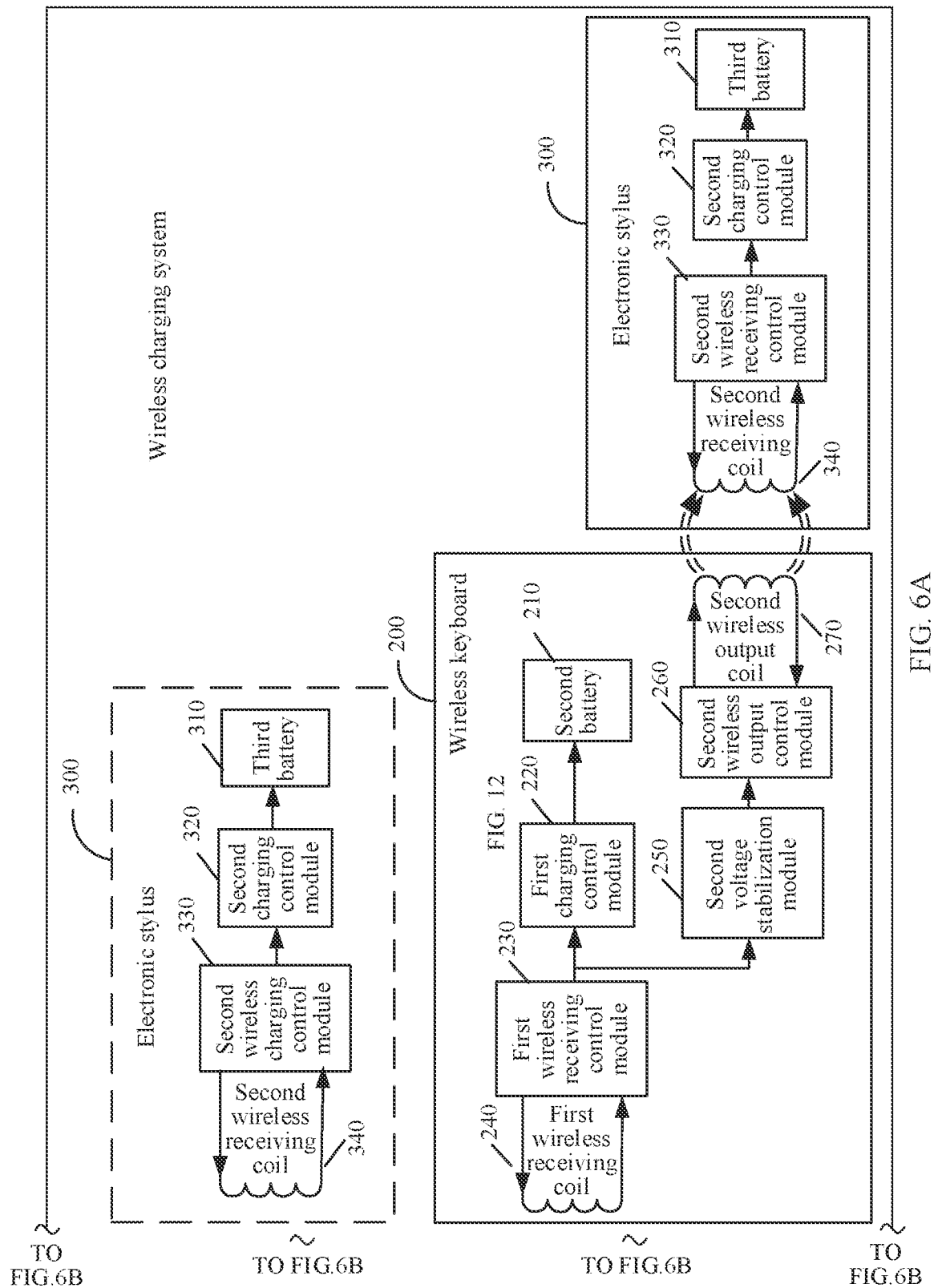

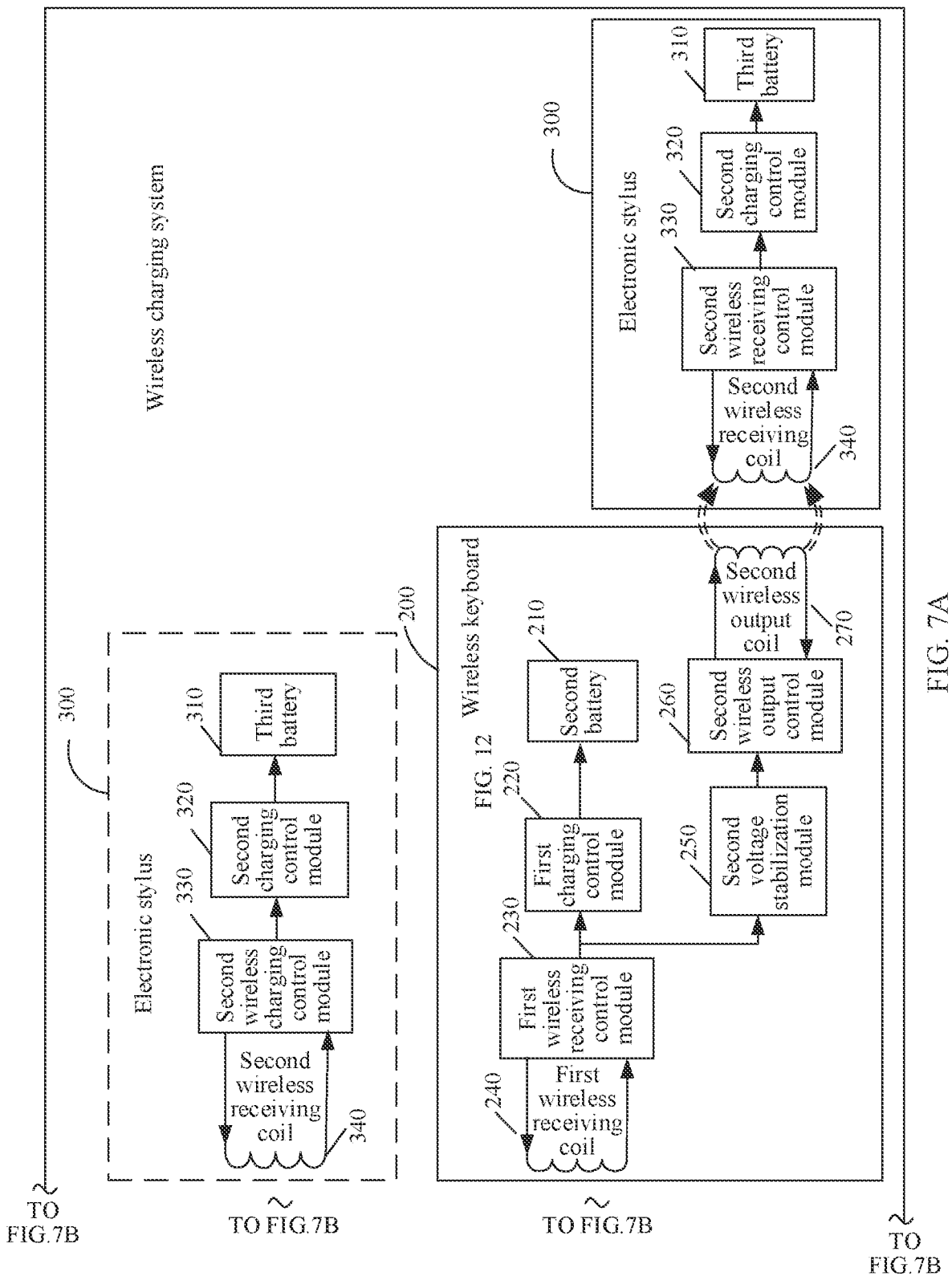

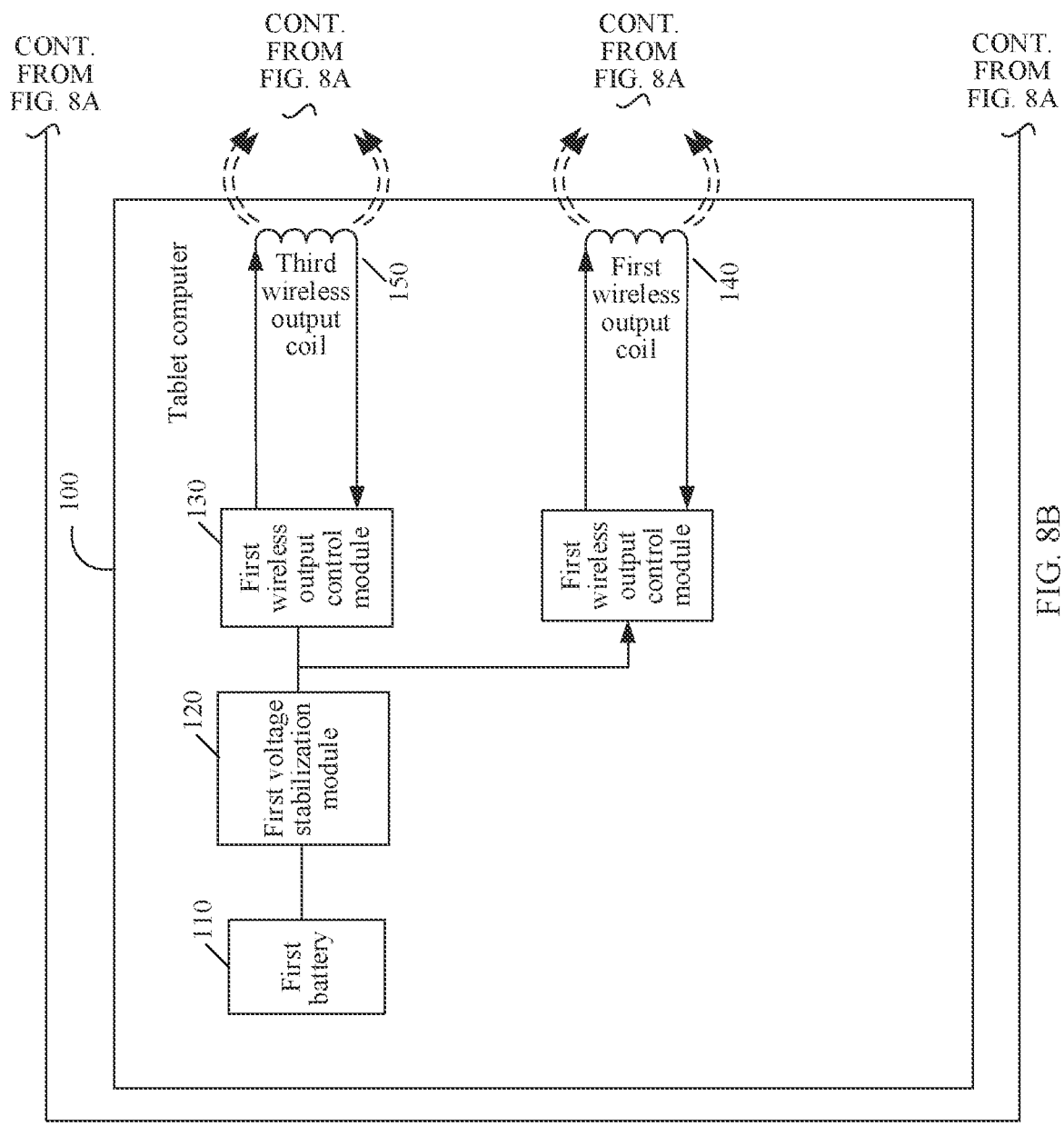

WIRELESS CHARGING SYSTEM

CROSS-REFERENCE TO RELATED APPLICATION

This application is a National Stage of International Application No. PCT/CN2022/075907, filed Feb. 10, 2022, which claims priority to Chinese Patent Application No. 202110352191.8, filed Mar. 31, 2021. The disclosures of which are incorporated herein by reference in their entireties.

TECHNICAL FIELD

Embodiments of this application relate to the field of terminal technologies, and in particular, to a wireless charging system.

BACKGROUND

With the development of technologies, some electronic products (for example, tablet computers) have been equipped with accessories such as a wireless keyboard and an electronic stylus. As an input device, the wireless keyboard has the advantage of a fast input speed. As a novel input device, the electronic stylus has the advantages such as that input is convenient, handwritten text can be implemented, and identity verification can be performed.

Currently, an electronic stylus is mainly charged in a wired charging manner and a wireless charging manner. In existing wired charging, generally, a wired charging interface is arranged on the electronic stylus, and is then connected to a power supply device such as an adapter by a cable. In this charging manner, it is difficult to achieve the integrity and aesthetics of the electronic stylus. In existing wireless charging, generally, wireless charging coils are arranged in both a tablet computer and an electronic stylus. The electronic stylus is then attracted to the tablet computer. The wireless charging coil in the electronic stylus is coupled to the wireless charging coil in the tablet computer to wirelessly charge the electronic stylus.

However, in the foregoing charging solution, the electronic stylus tends to fall off from the tablet computer due to weak attraction of the tablet computer. In addition, when the wireless keyboard and the electronic stylus are received as accessories, the wireless keyboard and the tablet computer may generally be received as a whole. However, the electronic stylus needs to be otherwise received. As a result, the tablet computer, the wireless keyboard, and the electronic stylus has relatively poor portability as a matching system.

SUMMARY

This application provides a wireless charging system. The wireless charging system may have the function of wirelessly charging an electronic stylus while receiving the electronic stylus, implements the integration of receiving and wireless charging, and provides adequate convenience.

In a first aspect, this application provides a wireless charging system, including a tablet computer, a wireless keyboard, and an electronic stylus, where the wireless keyboard includes a keyboard body, a bracket for placing the tablet computer, and a connecting portion for movably connecting the keyboard body and the bracket.

The tablet computer is provided with a first battery, a first wireless output control module, and a first wireless output coil, the first wireless output control module is connected to the first battery, and the first wireless output coil is connected to the first wireless output control module.

The keyboard body is provided with a first wireless receiving coil and a first wireless receiving control module, the first wireless receiving control module is connected to the first wireless receiving coil, and the first wireless receiving coil receives an electromagnetic signal sent by the first wireless output coil.

The connecting portion includes a receiving cavity provided with an opening at an end, and the receiving cavity is used for receiving the electronic stylus through the opening.

A second wireless output control module and a second wireless output coil are arranged in the receiving cavity, the second wireless output control module is connected to the first wireless receiving control module, the second wireless output coil is connected to the second wireless output control module, and the second wireless output coil is configured to wirelessly charge the electronic stylus received in the receiving cavity.

Based on this, two levels of wireless charging apparatuses are arranged, so that the tablet computer wirelessly charges the wireless keyboard, and the wireless keyboard wirelessly charges the electronic stylus. The first wireless output control module, the first wireless output coil, the first wireless receiving coil, and the first wireless receiving control module constitute a first level of wireless charging apparatus, so that the tablet computer wirelessly charges the wireless keyboard. The second wireless output control module, the second wireless output coil, and a wireless receiving coil and a wireless receiving control module that are arranged in the electronic stylus constitute a second level of wireless charging apparatus, so that the wireless keyboard wirelessly charges the electronic stylus. During implementation of two levels of wireless charging, the receiving cavity is arranged in the wireless keyboard, so that the receiving of the electronic stylus by the wireless keyboard is implemented, and the portability of the entire charging system is improved. The second wireless output control module and the second wireless output coil are arranged in the receiving cavity, the electronic stylus is wirelessly charged while the electronic stylus is received.

In a possible design of the first aspect, the keyboard body is further provided with a charging management module and a second battery, the charging management module is connected to the first wireless receiving control module, and is connected to the second wireless output module, and the second battery is connected to the charging management module.

Based on this, the charging management module and the second battery are arranged in the wireless keyboard, so that the charging management module can be configured to control a current, a voltage, and the like for charging the second battery, to stabilize the current and the voltage. The second battery can be used as a power supply to supply power to the wireless keyboard, or can be used as a power supply for the wireless keyboard to wirelessly charge the electronic stylus.

In a possible design of the first aspect, a voltage stabilization control module is arranged on the tablet computer, the voltage stabilization control module is connected to the first battery, and the first wireless output control module is connected to the voltage stabilization control module.

Based on this, the voltage stabilization control module is arranged on the tablet computer, so that the voltage stabilization control module can manage and control a voltage outputted by the first battery, so that the first battery can provide a stable voltage at different battery levels.

In a possible design of the first aspect, a third wireless output coil is further arranged in the tablet computer, the third wireless output coil is connected to the first wireless output control module, and the third wireless output coil is configured to wirelessly charge the electronic stylus attracted to the tablet computer.

Based on this, a third wireless output coil is arranged in the tablet computer, and the third wireless output coil is configured to wirelessly charge the electronic stylus, so that the tablet computer wirelessly charges the electronic stylus directly.

In a possible design of the first aspect, the tablet computer is further provided with a third wireless output control module and a third wireless output coil, the third wireless output control module is connected to the voltage stabilization control module, the third wireless output coil is connected to the third wireless output control module, and the third wireless output coil is configured to wirelessly charge the electronic stylus attracted to the tablet computer.

Based on this, the third wireless output coil is arranged in the tablet computer, and the third wireless output control module connected to the third wireless output coil is independently arranged, so that the third wireless output control module can be configured to detect, control, and transmit energy for wireless charging, the operation of the third wireless output coil is not affected by the first wireless output control module, and the tablet computer can wirelessly charge the electronic stylus and the wireless keyboard simultaneously.

In a possible design of the first aspect, a first control switch is arranged between the first wireless output coil and the first wireless output control module, and a second control switch is arranged between the third wireless output coil and the first wireless output control module.

Based on this, the first control switch and the second control switch are arranged, so that operating states of the wireless output coil and the third wireless output coil can be controlled, so that when both the first wireless output coil and the third wireless output coil are connected to the first wireless output control module, the wireless output coil on one side is controlled to operate, to avoid a case that both the first wireless output coil and the third wireless output coil are connected to the first wireless control module and are both in the operating state.

In a possible design of the first aspect, the connecting portion includes a rotating shaft, and the rotating shaft is used for movably connecting the keyboard body and the bracket. The rotating shaft is hollow inside, and an opening is provided at an end of the rotating shaft, to form the receiving cavity.

This design provides a specific implementation of the connecting portion.

In a possible design of the first aspect, the connecting portion includes a flexible connector and a receiving component. The flexible connector is used for bending to movably connect the keyboard body and the bracket, the receiving component is fixed in a bending area of the flexible connector, the receiving component is hollow inside, and an opening is provided at an end of the receiving component, to form the receiving cavity.

This design provides another specific implementation of the connecting portion.

In a possible design of the first aspect, a spring device is further arranged in the receiving cavity, where when the electronic stylus is received in the receiving cavity, the spring device is in contact with a second end of the electronic stylus; and the spring device is configured to eject, in response to a press operation performed by a user on a first end of the electronic stylus received in the receiving cavity, the electronic stylus from the receiving cavity in a direction from the second end to the first end, where the first end is an end located at the opening when the electronic stylus is received in the receiving cavity, and the second end is opposite to the first end.

Based on this, the spring device is arranged in the receiving cavity, so that the spring device can apply a particular elastic force to the electronic stylus after being pressed, to facilitate the removal of the electronic stylus from the receiving cavity.

In a second aspect, this application provides a computer-readable storage medium, including computer instructions. The computer instructions, when run on the wireless charging system, cause the wireless charging system to perform various functions of the wireless charging system described in the first aspect and any possible design of the first aspect.

In a third aspect, this application provides a computer program product. The computer program product, when run on a computer, causes the computer to perform various functions of the wireless charging system described in the first aspect and any possible design of the first aspect.

It may be understood that, for the beneficial effects that can be achieved by the computer-readable storage medium described in the second aspect and the computer program product described in the third aspect that are provided above, reference may be made to the beneficial effects in the first aspect and any possible design of the first aspect, and details are not described herein again.

BRIEF DESCRIPTION OF DRAWINGS

FIG. 6A and FIG. 6B are schematic diagrams of a system architecture of another wireless charging system according to an embodiment of this application;

FIG. 7A and FIG. 7B are schematic diagrams of a system architecture of still another wireless charging system according to an embodiment of this application;

FIG. 8A and FIG. 8B are schematic diagrams of a system architecture of yet another wireless charging system according to an embodiment of this application;

DESCRIPTION OF EMBODIMENTS

Figure 1:
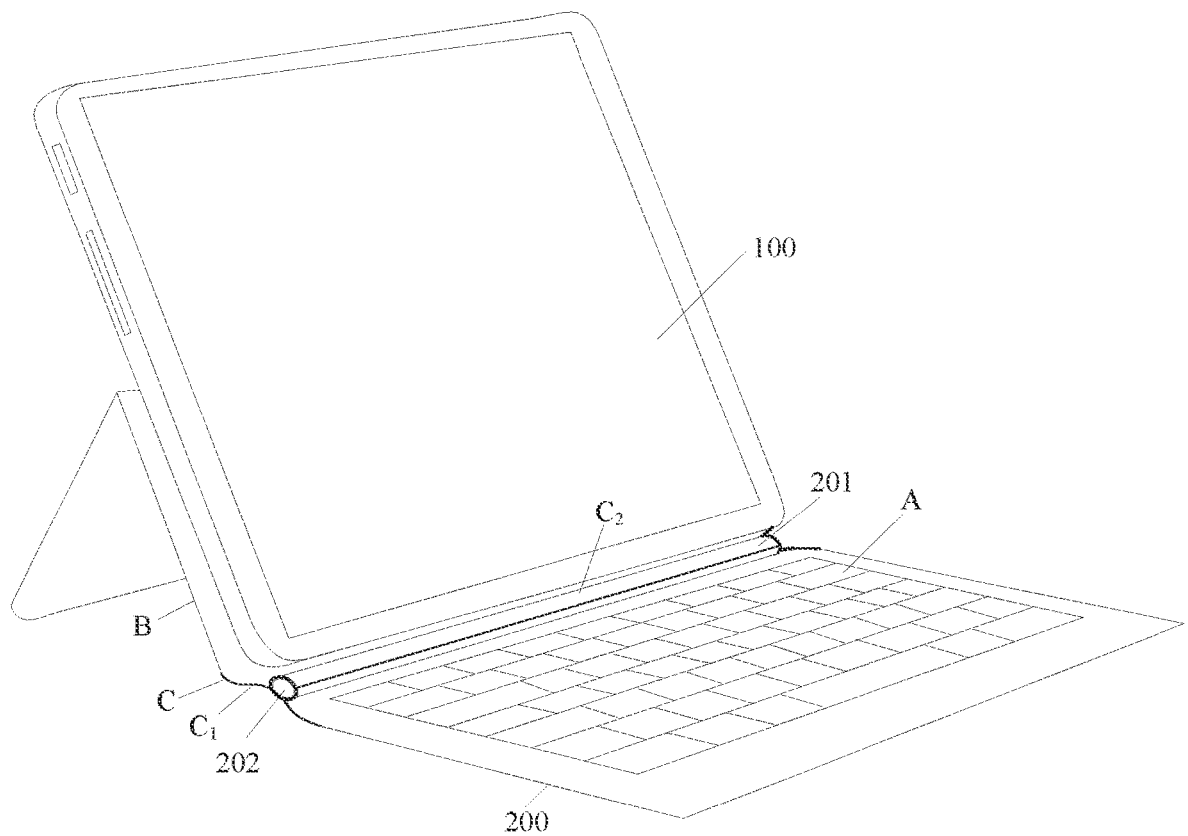
FIG. 1 is a schematic diagram of a product form of a wireless charging system according to an embodiment of this application.

The following describes technical solutions of this application with reference to accompanying drawings.

In this embodiment of this application, the word "exemplary" or "for example" is used for representing giving an example, an illustration, or a description. Any embodiment or design solution described as an "exemplary" or "for example" in the embodiments of this application should not be explained as being more preferred or having more advantages than other embodiments or design solutions. Exactly, use of the word "exemplary" or "for example" or the like is intended to present a related concept in a specific manner.

In the embodiments of this application, the terms such as "first" and "second" are used only for the purpose of description, and should not be understood as indicating or implying the relative importance or implicitly specifying the number of indicated technical features. Therefore, a feature defined by "first" or "second" can explicitly or implicitly includes one or more features.

It should be understood that, terms used in description of the various examples in this specification are only for describing specific examples and are not intended to impose limitations. As used in the description of the various examples, singular forms, one ("a" or "an") and "the", are intended to also include plural forms, unless the context clearly indicates otherwise.

In this application, "at least one" indicates one or more and "a plurality of" indicates two or more. "At least one of the following" or a similar expression thereof refers to any combination of these items, including one item or any combination of a plurality of items. For example, at least one of a, b, or c may represent a, b, c, "a-b", "a-c", "b-c", or "a-b-c", where a, b, and c may be singular or plural.

It should also be understood that, as used herein, the term "and/or" refers to and includes any and all possible combinations of one or more of the associated listed items. The term "and/or" describes an association relationship for describing associated objects and represents that three relationships may exist. For example, A and/or B may represent the following three cases: only A exists, both A and B exist, and only B exists. In addition, the character "/" in this application generally indicates an "or" relationship between associated objects.

It should also be understood that, in this application, unless otherwise explicitly specified or defined, the term "connection" should be understood in a broad sense. For example, the connection may be a fixed connection, a siding connection, a detachable connection, or an integral connection; or may be a direct connection, an indirect connection through an intermediary.

It should also be understood that, the terms "include" (also referred to as "includes", "including", "comprises" and/or "comprising"), when used in this specification, specify the presence of stated features, integers, steps, operations, elements, and/or components, but do not preclude the presence or addition of one or more other features, integers, steps, operations, elements, components, and/or groups thereof.

It should be understood that "an embodiment", "another embodiment" or "in a possible design" mentioned throughout the specification means that particular features, structures, or characteristics related to the embodiments or the implementations are included in at least one embodiment of this application. Therefore, "in an embodiment of this application", "in another embodiment of this application" or "in a possible design" occurs in everywhere throughout the specification may not necessarily refer to the same embodiment. In addition, these specific features, structures, or properties may be merged in one or more embodiments in any proper manner.

In the prior art, to resolve a problem that it is inconvenient to receive a tablet computer, a wireless keyboard, and an electronic stylus as a matching system during wireless charging, an embodiment of this application provides a wireless charging system, which may have the function of wirelessly charging an electronic stylus while receiving the electronic stylus, implements the integration of receiving and wireless charging, and provides adequate convenience. The following describes the embodiments of this application with reference to FIG. 1 to FIG. 14.

FIG. 1 is a schematic diagram of a product form of a wireless charging system according to an embodiment of this application. As shown in FIG. 1, the wireless charging system includes a tablet computer 100 and a wireless keyboard 200. The wireless keyboard 200 includes a keyboard body A and a bracket B for placing the wireless keyboard 200. The keyboard body A and the bracket B are connected by a connecting portion C. The connecting portion C may be made of a flexible material or a rotating shaft, so that the keyboard body A and the bracket B can rotate relative to each other. The tablet computer 100 is placed or sleeved on the bracket B, and forms a particular angle with the keyboard body in the wireless keyboard 200.

Figure 3:
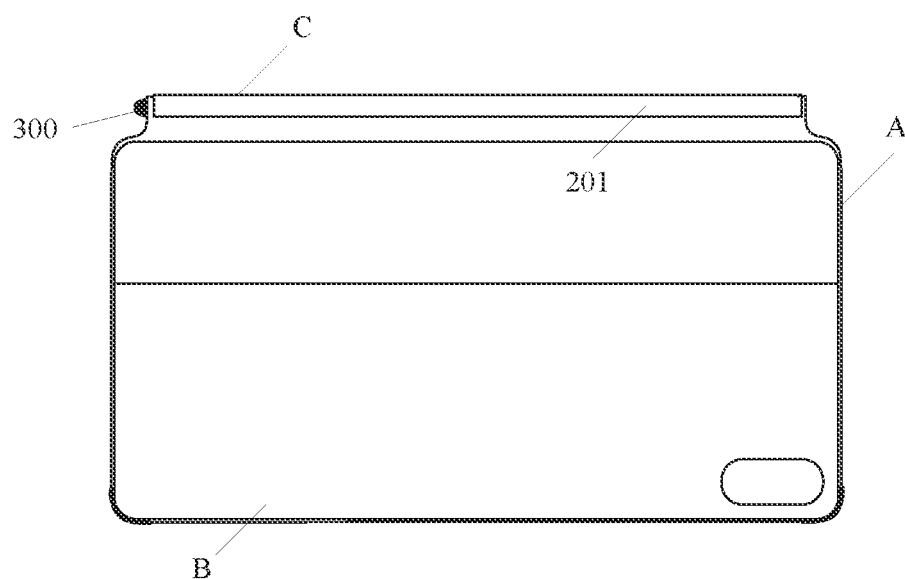
FIG. 3 is a bottom view of the wireless charging system shown in FIG. 1 after receiving the electronic stylus shown in FIG. 2.
Figure 4:
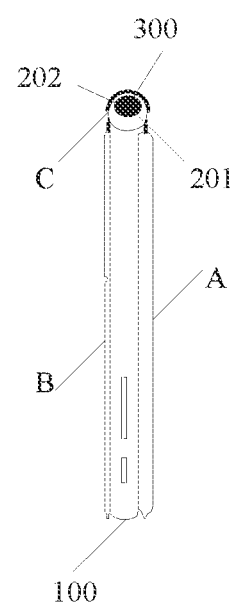
FIG. 4 is a left view of the wireless charging system shown in FIG. 1 after receiving the electronic stylus shown in FIG. 2.

As shown in FIG. 1, a receiving cavity 201 is arranged on the connecting portion C of the wireless keyboard 200 in the wireless charging system. An opening 202 is provided at an end of the receiving cavity 201. The electronic stylus 300 shown in FIG. 2 may be placed in the receiving cavity 201 shown in FIG. 1 through the opening 202. A form of the wireless charging system after receiving the electronic stylus 300 is as follows:

FIG. 3 is a bottom view of the wireless charging system after the keyboard body A and the bracket B of the wireless keyboard 200 are combined and the electronic stylus 300 is inserted into the receiving cavity 201 through the opening 202. FIG. 4 is a left view of the wireless charging system after the tablet computer 100 is placed in the bracket B, the keyboard body A and the bracket B of the wireless keyboard 200 are combined, and the electronic stylus 300 is inserted into the receiving cavity 201 through the opening 202.

In this embodiment of this application, the tablet computer 100 may wirelessly charge the wireless keyboard 200. The tablet computer 100 is provided with a wireless charging coil that sends an electromagnetic signal during charging. The wireless keyboard 200 is correspondingly provided with a wireless charging coil that receives the electromagnetic signal. The wireless charging coil of the wireless keyboard 200 may be coupled to the wireless charging coil of the tablet computer 100. The tablet computer 100 may transmit a wireless charging signal to the wireless keyboard 200 through the wireless charging coil, to wirelessly charge the wireless keyboard 200.

In this embodiment of this application, the wireless keyboard 200 may wirelessly charge the electronic stylus 300. Specifically, a wireless charging coil that may generate an electromagnetic signal may be arranged in the receiving cavity 201 of the wireless keyboard 200. After the electronic stylus 300 is received in the receiving cavity 201 of the wireless keyboard 200, the wireless keyboard 200 may wirelessly charge the electronic stylus 300 through the wireless charging coil arranged in the receiving cavity 201. Certainly, a body of the electronic stylus 300 is also provided with a wireless charging coil. The wireless charging coil may receive the electromagnetic signal sent in the receiving cavity 201. In this case, the wireless charging coil of the wireless keyboard 200 may be coupled to the wireless charging coil of the electronic stylus 300. The wireless keyboard 200 transmits a wireless charging signal to the electronic stylus 300 through the coupled wireless charging coil, to wirelessly charge the electronic stylus 300.

In addition, the tablet computer 100 may wirelessly charge the electronic stylus 300 directly (not shown in the figure). Specifically, the electronic stylus 300 may be attracted to the tablet computer 100. The tablet computer 100 is provided with a wireless charging coil that generates an electromagnetic signal for the electronic stylus 300. An attraction position of the electronic stylus 300 is close to the wireless charging coil. A body of the electronic stylus 300 is provided with a wireless charging coil that may receive the electromagnetic signal sent by the tablet computer 100. In this case, the wireless charging coil of the tablet computer 100 may be coupled to the wireless charging coil of the electronic stylus 300. The tablet computer 100 transmits a wireless charging signal to the electronic stylus 300 through the coupled wireless charging coil, to wirelessly charge the electronic stylus 300.

In this embodiment of this application, the function that tablet computer 100 wirelessly charges the wireless keyboard 200 or the electronic stylus 3M) through a wireless coil is referred to as a "forward wireless charging function". The function that the wireless keyboard 200 wirelessly charges the electronic stylus 300 through the wireless charging coil is referred to as a "reverse wireless charging function".

For ease of understanding, the principles of the tablet computer 100 wirelessly charging the wireless keyboard 200 and the wireless keyboard 200 wirelessly charging the electronic stylus 300 are described in this embodiment of this application with reference to the accompanying drawings.

Figure 5A:
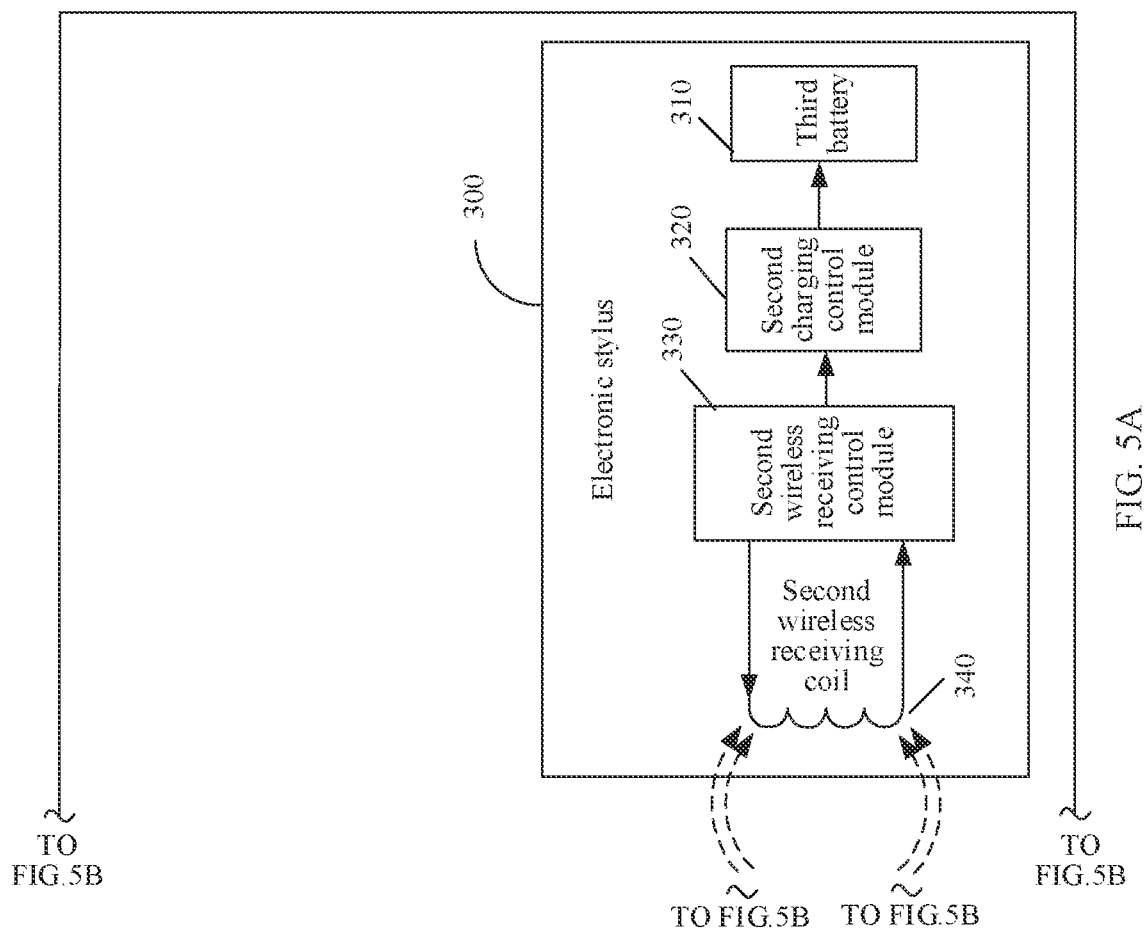
FIG. 5A and FIG. 5B are schematic diagrams of a system architecture of a wireless charging system according to an embodiment of this application.
Figure 5B:
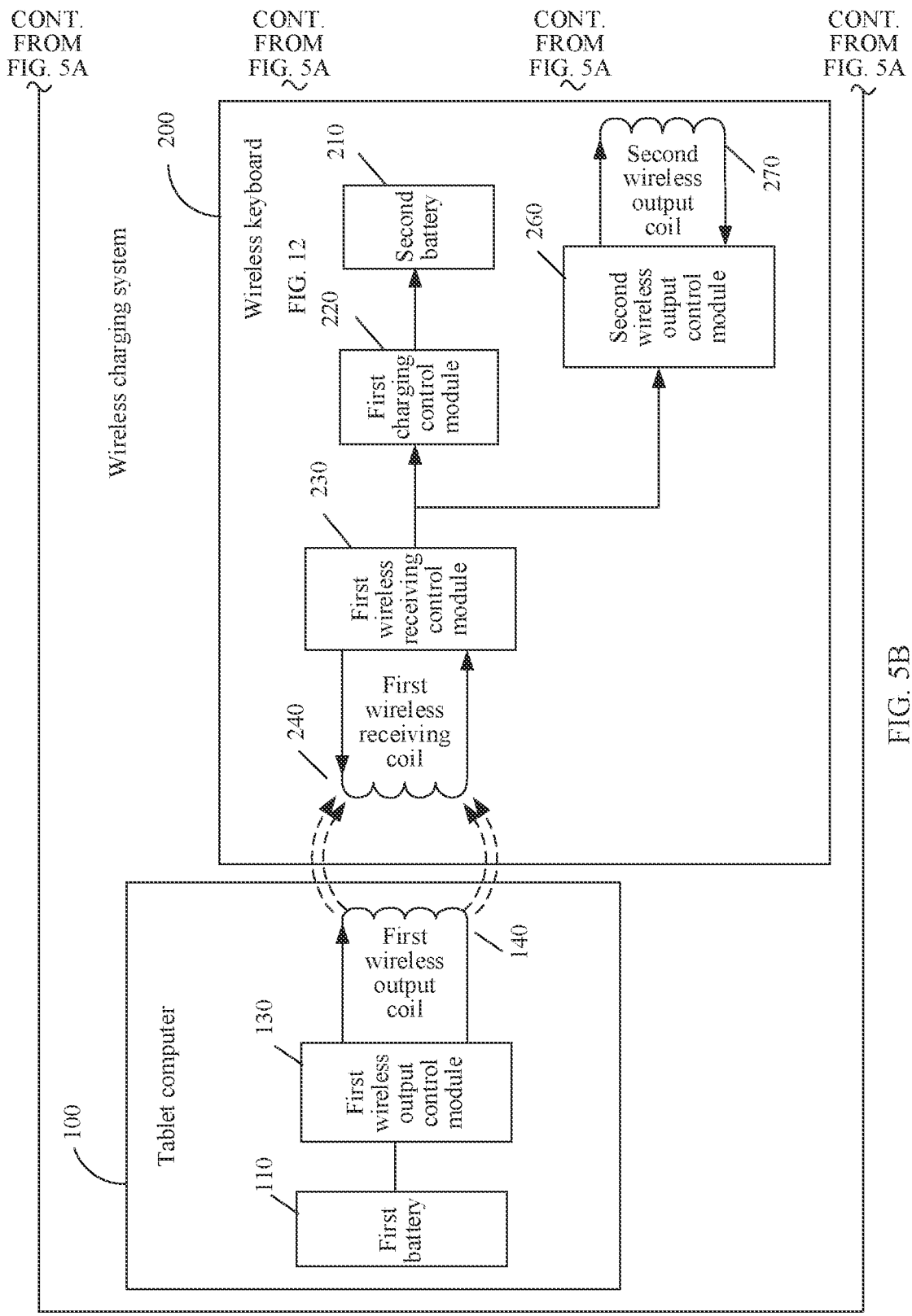

FIG. 5A and FIG. 5B are schematic diagrams of a system architecture of a wireless charging system according to an embodiment of this application. The wireless charging system includes a tablet computer 100, a wireless keyboard 200, and an electronic stylus 300.

As shown in FIG. 5A and FIG. 5B, the tablet computer 100 includes a first battery 110, a first wireless output control module 130, and a first wireless output coil 140. The first wireless output control module 130 is electrically connected to the first battery 110. The first wireless output coil 140 is electrically connected to the first wireless output control module 130.

The wireless keyboard 200 includes a second battery 210, a first charging control module 220, a first wireless receiving control module 230, a first wireless receiving coil 240, a second wireless output control module 260, and a second wireless output coil 270. The second battery 210 is electrically connected to the first charging control module 220. The first charging control module 220 is electrically connected to the first wireless receiving control module 230. The first wireless receiving control module 230 is electrically connected to the first wireless receiving coil 240. The second wireless output control module 260 is electrically connected to the first wireless receiving control module 230. The second wireless output coil 270 is electrically connected to the second wireless output control module 260.

The electronic stylus 300 includes: a third battery 310, a second charging control module 320, a second wireless receiving control module 330, and a second wireless receiving coil 340. The third battery 310 is electrically connected to the second charging control module 320. The second charging control module 320 is electrically connected to the second wireless receiving control module 330. The second wireless receiving control module 330 is electrically connected to the second wireless receiving coil 340.

The foregoing electrical connection includes a direct electrical connection and an indirect electrical connection. For example, the second wireless output control module 260 may be electrically connected to the first wireless receiving control module 230. The second wireless output control module 260 may also be electrically connected to the first charging control module 220. Because the first charging control module 220 is electrically connected to the first wireless receiving control module 230, it is equivalent to that the second wireless output control module 260 is electrically connected to the first wireless receiving control module 230 indirectly.

The first wireless output control module 130 may be a TX chip of the tablet computer 100. The first charging control module 220 may be a keyboard charger of the wireless keyboard 200. The first wireless receiving control module 230 may be an RX chip of the wireless keyboard 200. The second wireless output control module 260 may be a TX chip of the wireless keyboard 200. The second charging control module 320 may be a stylus charger of the electronic stylus 300. The second wireless receiving control module 330 may be an RX chip of the electronic stylus 300.

In a process that the tablet computer 100 wirelessly charges the wireless keyboard 200, the first battery 110 of the tablet computer 100 may be used as a power supply to supply power. The first wireless output control module 130 of the tablet computer 100 may receive a direct current electric signal inputted by the first battery 110. The first wireless output control module 130 converts the direct current electric signal received by the first wireless output control module into an alternating current electric signal, and then inputs the alternating current electric signal into the first wireless output coil 140. The first wireless output coil 140 generates an alternating electromagnetic field in response to the alternating current electric signal.

The first wireless receiving coil 240 of the wireless keyboard 200 is coupled to the first wireless output coil 140 of the tablet computer 100. The first wireless receiving coil 240 senses the alternating electromagnetic field sent by the first wireless output coil 140 to generate an alternating current electric signal, and then sends the alternating current electric signal to the first wireless receiving control module 230. The first wireless receiving control module 230 may rectify the alternating current electric signal into a direct current electric signal, and then input the direct current electric signal into the first charging control module 220. The first charging control module 220 may manage the direct current electric signal, for example, manage an inputted current and voltage, and then input the direct current electric signal into the second battery 210 to charge the second battery 210. The second battery 210 may be used as a power supply for the wireless keyboard 200 to implement the reverse wireless charging function.

Generally, the reverse wireless charging function of the wireless keyboard 200 is disabled by default. The wireless keyboard 200 may enable the reverse wireless charging function after detecting an input of a direct current electric signal.

After the reverse wireless charging function of the wireless keyboard 200 is enabled, the first wireless receiving control module 230 rectifies a received alternating current electric signal into a direct current electric signal and may then input part of a direct current electric signal into the second battery 210, to charge the second battery 210, and input part of the direct current electric signal into the second wireless output control module 260. The second wireless output control module 260 may convert the received direct current electric signal into an alternating current electric signal, and then input the alternating current signal into the second wireless output coil 270. The second wireless output coil 270 may generate an alternating magnetic field in response to the alternating current signal.

The second wireless receiving coil 340 on the electronic stylus 300 is coupled to the second wireless output coil 270 on the wireless keyboard 200. After the electronic stylus 300 is received in the receiving cavity 201 in the wireless keyboard 200 and the second wireless output coil 270 in the receiving cavity 201 generates the alternating magnetic field, the second wireless receiving coil 340 on the body of the electronic stylus 300 starts to operate. The second wireless receiving coil 340 senses the alternating electromagnetic field sent by the second wireless output coil 270 to generate an alternating current electric signal, and inputs the alternating current electric signal into the second wireless receiving control module 330. The second wireless receiving control module 330 rectifies the received alternating current electric signal into a direct current electric signal, and then inputs the direct current electric signal into the second charging control module 320. After processing the direct current electric signal, the second charging control module 320 inputs the direct current electric signal into the third battery 310, to charge the third battery 310.

The first wireless output control module 130, the first wireless receiving control module 230, the second wireless output control module 260, and the second wireless receiving control module 330 may include matching circuits. The matching circuit may include a combination of capacitors.

The matching circuit in the first wireless output control module 130 is configured to form LC resonance with the first wireless output coil 140, to improve the transmission efficiency of the first wireless output coil 140. The matching circuit in the first wireless receiving control module 230 is configured to form LC resonance with the first wireless receiving coil 240, to improve the receiving efficiency of the first wireless receiving coil 240. The matching circuit in the second wireless output control module 260 is configured to form LC resonance with the second wireless output coil 270, to improve the transmission efficiency of the second wireless output coil 270. The matching circuit in the second wireless receiving control module 330 is configured to form LC resonance with the second wireless receiving coil 340, to improve the receiving efficiency of the second wireless receiving coil 340.

Figure 6B:
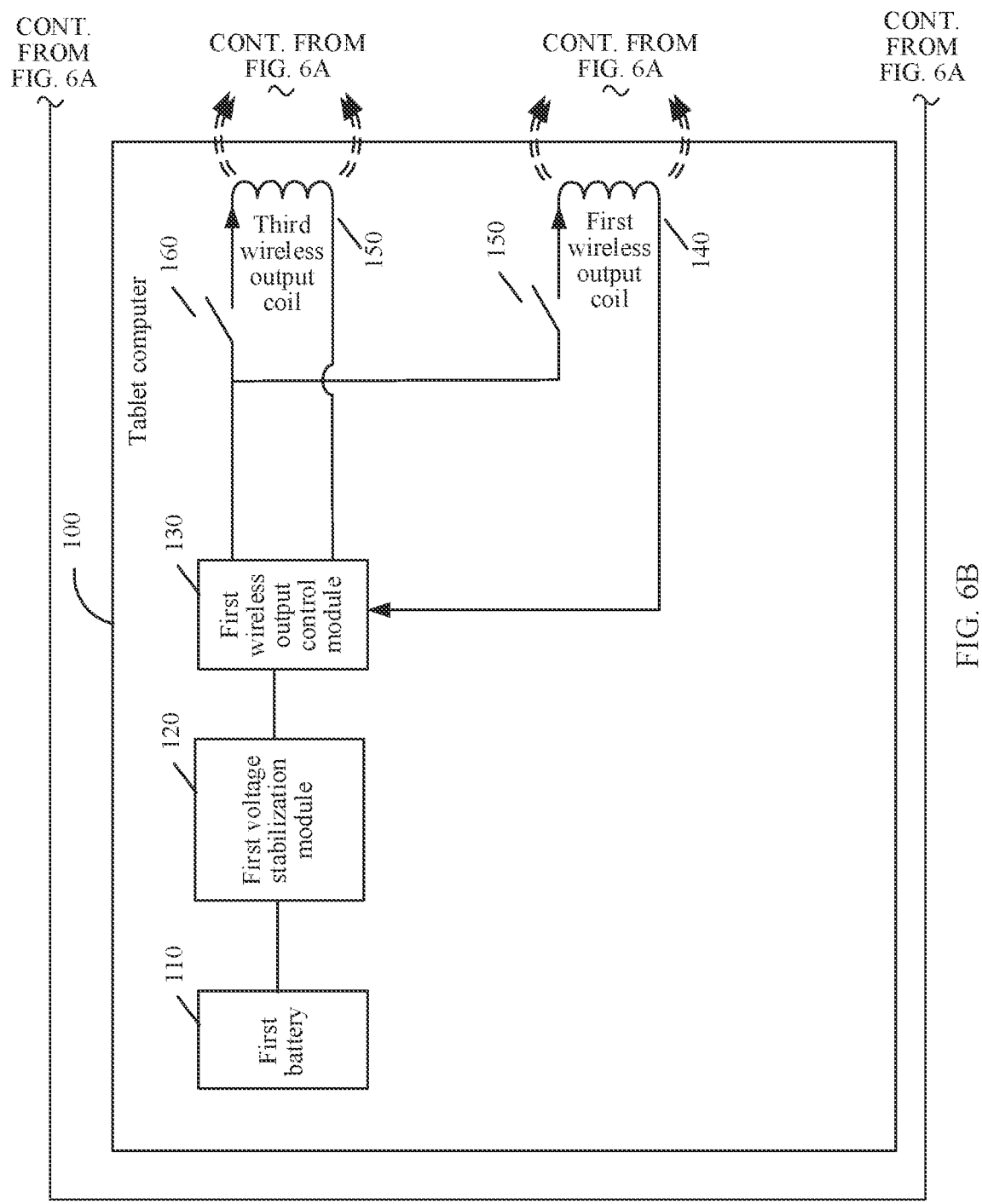

In an embodiment of this application, the tablet computer 100 further includes a third wireless output coil. The third wireless output coil is electrically connected to the first wireless output control module 130. FIG. 6A and FIG. 6B are schematic diagrams of a system architecture of another wireless charging system according to an embodiment of this application.

As shown in FIG. 6A and FIG. 6B, the third wireless output coil arranged on the tablet computer 100 may be configured to charge the electronic stylus 300. Specifically, the electronic stylus 300 may be attracted to the tablet computer 100 or placed on the tablet computer 100, so that the electronic stylus is close to the third wireless output coil in the tablet computer 100. In a process that the tablet computer 100 wirelessly charges the electronic stylus 300, the first battery 110 of the tablet computer 100 may be used as a power supply to supply power to the first wireless output control module 130. The first wireless output control module 130 receives a direct current electric signal inputted by the first battery 110, and then converts the direct current electric signal received by the first wireless output control module into an alternating current electric signal. Because the third wireless output coil is electrically connected to the first wireless output control module 130, the first wireless output control module 130 may input the alternating current electric signal into the third wireless output coil, and the third wireless output coil generates an alternating electromagnetic field in response to the alternating current electric signal.

The second wireless receiving coil 340 on the electronic stylus 300 may be coupled to the third wireless output coil in the tablet computer 100. When the electronic stylus 300 is attracted near the third wireless output coil in the tablet computer 100, the second wireless receiving coil 340 senses the alternating electromagnetic field sent by the third wireless output coil to generate an alternating current electric signal, and inputs the alternating current electric signal into the second wireless receiving control module 330. The second wireless receiving control module 330 rectifies the received alternating current electric signal into a direct current electric signal, and then inputs the direct current electric signal into the second charging control module 320. After processing the direct current electric signal, the second charging control module 320 inputs the direct current electric signal into the third battery 310, to charge the third battery 310.

It should be noted that, in this embodiment of this application, because both the first wireless output coil 140 and the third wireless output coil are electrically connected to the first wireless output control module 130, the first wireless output control module 130 controls energy for wireless charging of both the first wireless output coil 140 and the third wireless output coil. To ensure that the first wireless output coil 140 and the third wireless output coil have a sufficient voltage and current during wireless charging, generally, only one wireless charging coil operates when the tablet computer 100 performs forward wireless charging externally.

In an embodiment of this application, a first control switch 150 is arranged between the first wireless output coil 140 and the first wireless output control module 130. A second control switch 160 is arranged between the third wireless output coil and the first wireless output control module 130. Operating states of the first wireless output coil 140 and the third wireless output coil may be adjusted by controlling states of the first control switch 150 and the second control switch 160.

For example, the first control switch 150 may be closed, and the second control switch 160 may be opened. In this case, the tablet computer 100 is in a state of wirelessly charging the wireless keyboard 200 only. That is, the first wireless charging coil is in the operating state, and the third wireless output coil is in an operation stop state, to provide a stable current and voltage and sufficient energy to the first wireless charging coil. Alternatively, the second control switch 160 may be closed, and the first control switch 150 may be opened. In this case, the tablet computer 100 is in a state of wirelessly charging the electronic stylus 300 only. That is, the third wireless charging coil is in the operating state, and the first wireless charging coil is in an operation stop state, to provide a stable current and voltage and sufficient energy to the third wireless charging coil.

The first wireless output control module 130 is generally integrated on a TX chip of the tablet computer 100. Therefore, with the foregoing arrangement, only one TX chip may be arranged on the tablet computer 100, to control the first wireless output coil 140 and the third wireless output coil, thereby reducing the costs.

Figure 7B:
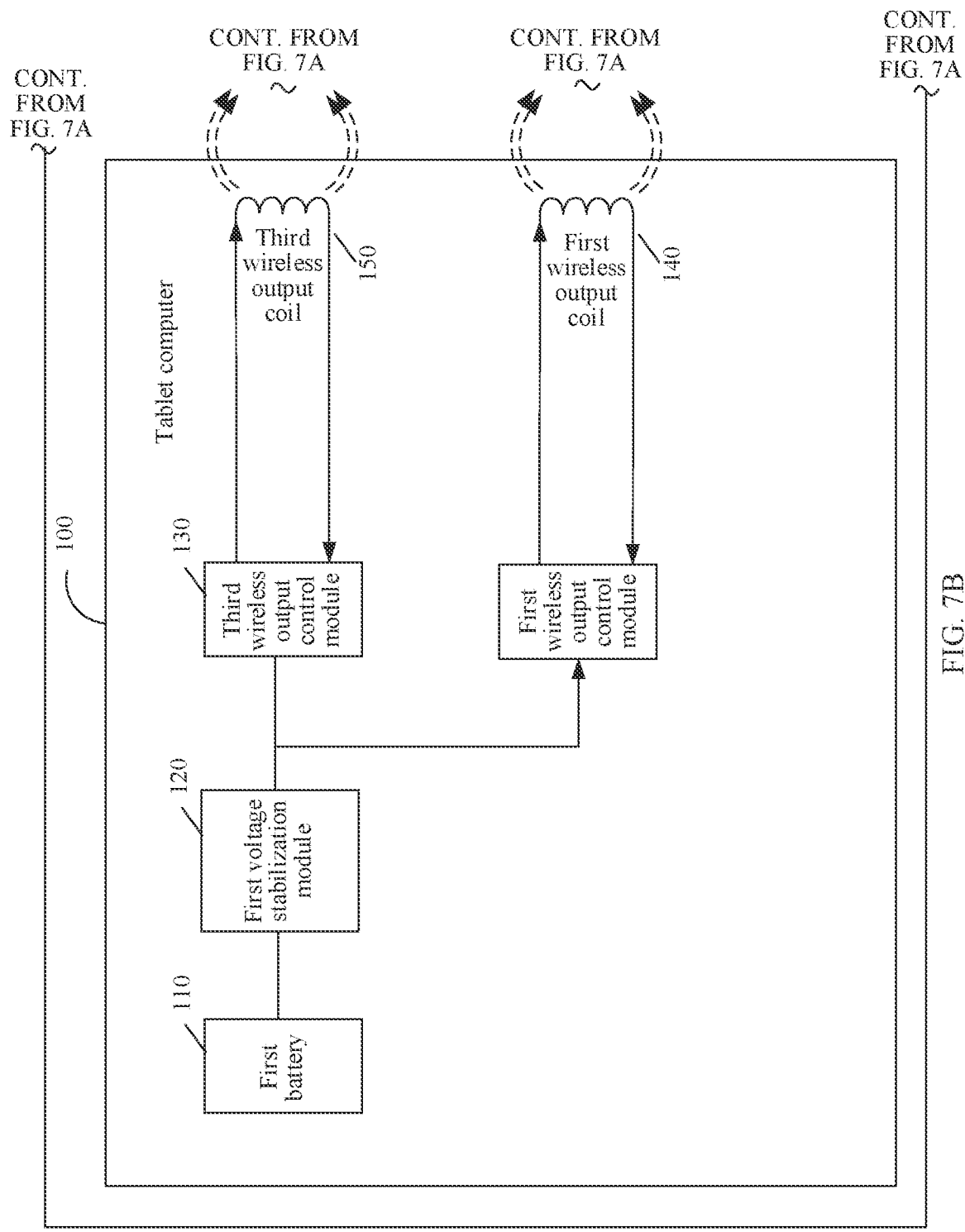

In an embodiment of this application, the tablet computer 100 further includes a third wireless output control module and a third wireless output coil. The third wireless output coil is electrically connected to the third wireless output control module. The third wireless output control module is electrically connected to the first battery 110. FIG. 7A and FIG. 7B are schematic diagrams of a system architecture of still another wireless charging system according to an embodiment of this application.

As shown in FIG. 7A and FIG. 7B, in a process that the tablet computer 100 wirelessly charges the electronic stylus 300, the first battery 110 of the tablet computer 100 may be used as a power supply to supply power to the third wireless output control module. The third wireless output control module receives a direct current electric signal inputted by the first battery 110, and then converts the direct current electric signal received by the first wireless output control module into an alternating current electric signal. Because the third wireless output coil is electrically connected to the third wireless output control module, the third wireless output control module may input the alternating current electric signal into the third wireless output coil. The third wireless output coil generates an alternating electromagnetic field in response to the alternating current electric signal. For interaction between the electronic stylus 300 and the third wireless output coil, reference may be made to the description in the foregoing embodiments, and details are not described herein again.

The third wireless output control module may be a TX chip of the tablet computer 100. In this embodiment of this application, this is equivalent to arranging two TX chips to control the first wireless output coil 140 and the third wireless output coil respectively. The two TX chips may independently control indicators such as currents and voltages inputted into the first wireless output coil 140 and the third wireless output coil, so that the first wireless output coil 140 and the third wireless output coil can operate simultaneously. That is, when the electronic stylus 300 is attracted to the tablet computer 100, the tablet computer 100 may wirelessly charge the electronic stylus 300 and the wireless keyboard 200 simultaneously.

In an embodiment of this application, as shown in FIG. 7A and FIG. 7B, the tablet computer 100 further includes a first voltage stabilization module 120. The first voltage stabilization module 120 is connected in series between the first battery 110 and the first wireless output control module 130. If the tablet computer 100 is provided with the third wireless output control module, the first voltage stabilization module 120 is also connected in series between the first battery 110 and the third wireless output control module. The first voltage stabilization module 120 may be a BOOST chip, a BUCK-BOOST chip, or the like. A main function of the first voltage stabilization module 120 is to provide a stable voltage to the first wireless output control module 130 and/or the third wireless output control module in a case that the battery is at different battery levels.

In some other embodiments, a voltage value of the direct current electric signal provided by the first wireless receiving control module 230 may be different from an operating voltage value of the second wireless output control module 260. For example, the operating voltage value of the second wireless output control module 260 may be 5.5 V. and the voltage value of the direct current electric signal provided by the first wireless receiving control module 230 may be 5 V. Alternatively, a voltage value of the direct current electric signal provided by the first wireless receiving control module 230 may be unstable. In this way, the normal operation of the second wireless output control module 260 may be affected.

Therefore, the wireless keyboard 200 may further include a second voltage stabilization module 250. The second voltage stabilization module 250 is connected in series between the first wireless receiving control module 230 and the second wireless output control module 260. The second voltage stabilization module 250 may be a BOOST chip. The second voltage stabilization module 250 is configured to convert a voltage inputted by the first wireless receiving control module 230 into an operating voltage of the second wireless output control module 260. In this way, the normal operation of the second wireless output control module 260 and the subsequent second wireless output coil 270 can be ensured.

Figure 8A:
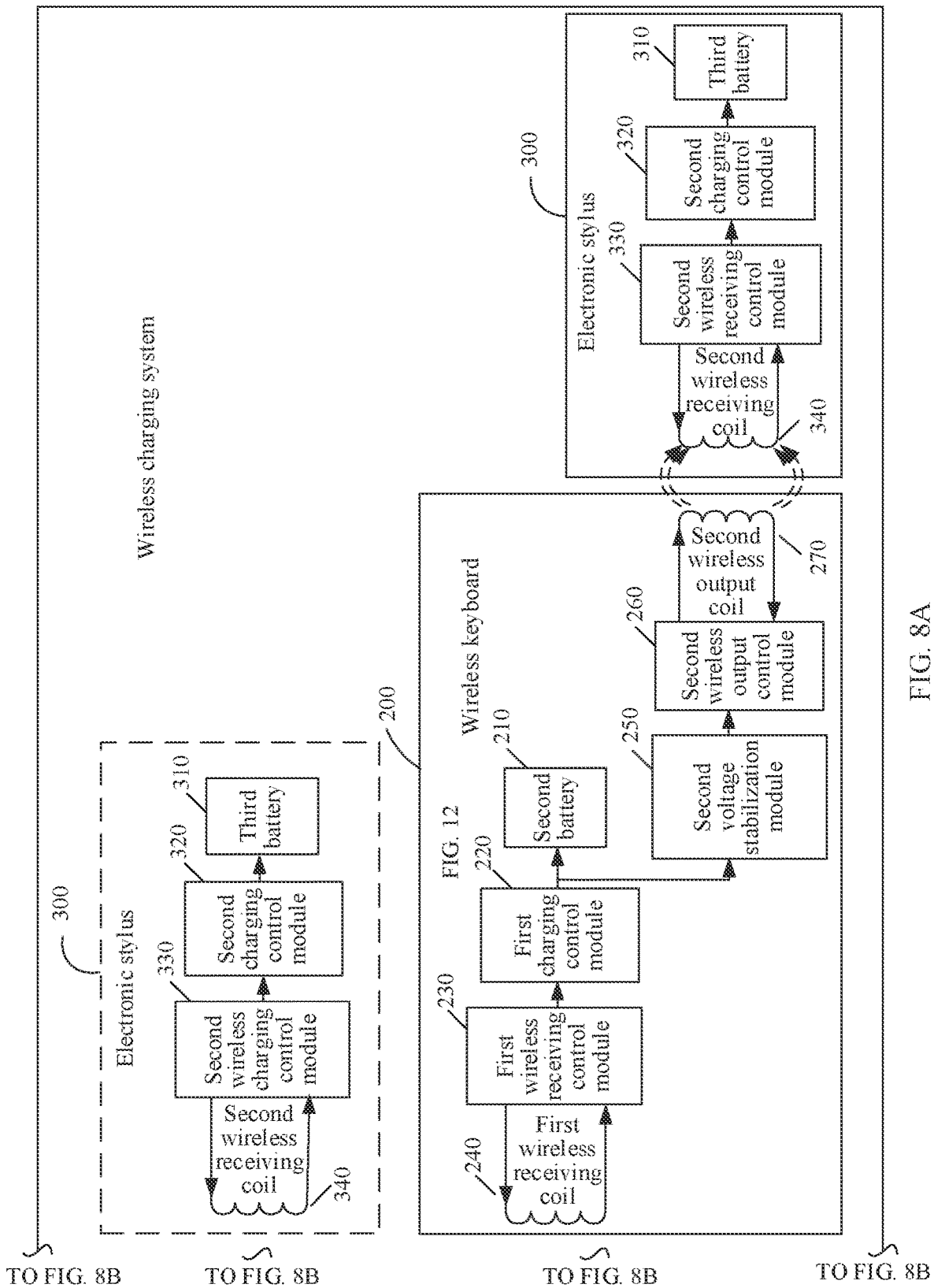

In an embodiment of this application, the second voltage stabilization module 250 is connected in series between the first charging control module 220 and the second wireless output control module 260. FIG. 8A and FIG. 8B are schematic diagrams of a system architecture of yet another wireless charging system according to an embodiment of this application. As shown in FIG. 8A and FIG. 8B, the second voltage stabilization module 250 is electrically connected to the first charging control module 220. The first charging control module 220 is electrically connected to the first wireless receiving control module 230. This is equivalent to that the second voltage stabilization module 250 is indirectly connected to the first wireless receiving control module 230. For other structures and connection manners in the wireless charging system, reference may be made to the foregoing embodiments, and details are not described in this embodiment.

It should be noted that, FIG. 5A, FIG. 5B, FIG. 6A, FIG. 6B, FIG. 7A. FIG. 7B, FIG. 8A, and FIG. 8B only show schematic diagrams of some possible charging circuit structures of the wireless charging system. The charging circuit structures of the wireless charging system in the embodiments of this application include, but are not limited to, the structures shown in FIG. 5A to FIG. 8B. For example, the functions of the first charging control module 220 and the second wireless output control module 260 shown in FIG. 5A and FIG. 5B may be integrated into one charging management module for implementation. In another example, the wireless keyboard 200 may further include a processor. The processor is connected to the first wireless receiving control module 230, the first charging control module 220, and the second wireless output control module 260. The processor is configured to detect whether there is a current inputted into the first wireless receiving control module 230. The processor is further configured to control the first charging control module 220 and/or the second wireless output control module 260 to operate, to implement the forward wireless charging function and/or the reverse wireless charging function of the wireless keyboard 200.

Figure 9:
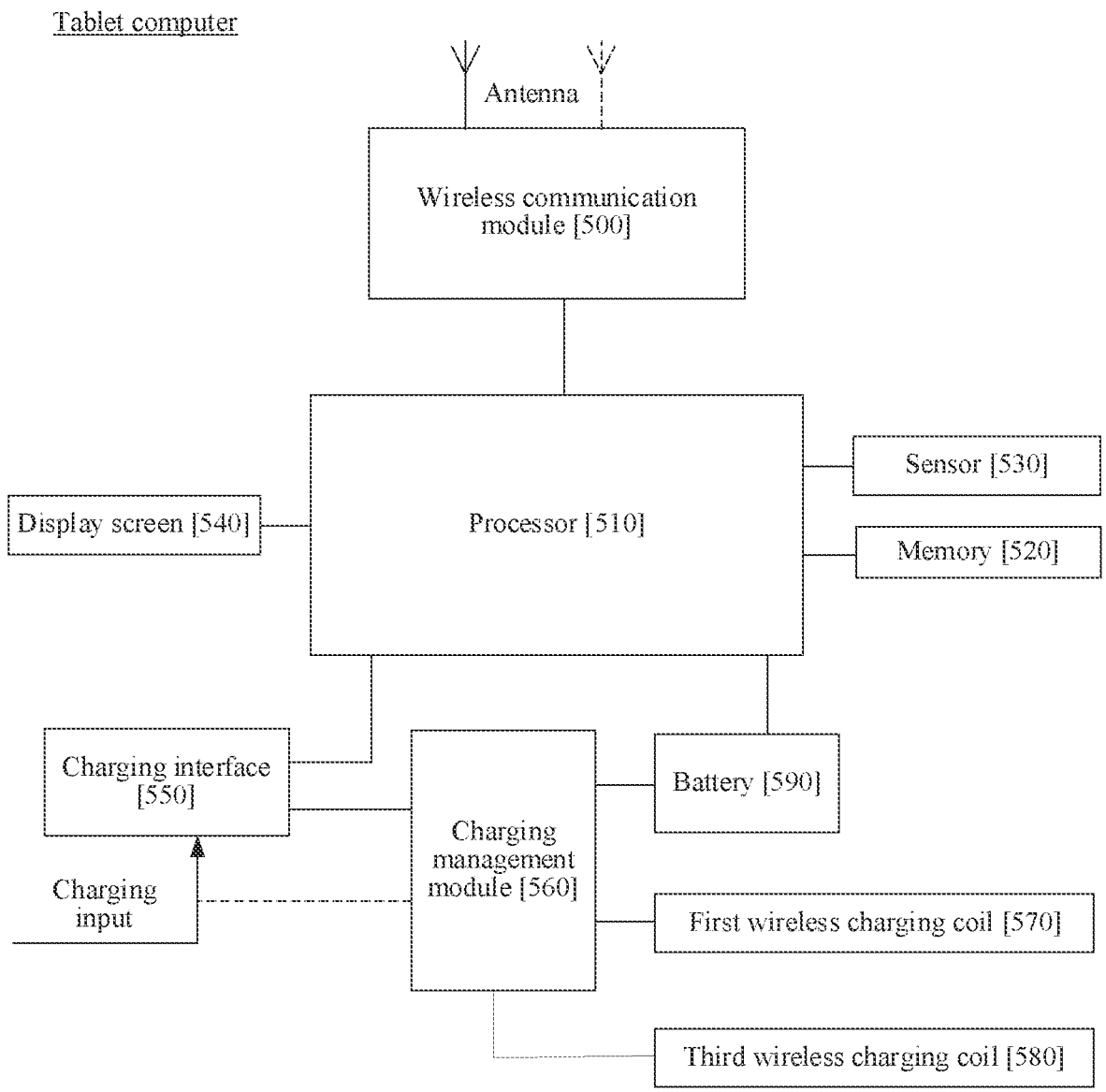
FIG. 9 is a schematic diagram of a hardware structure of a tablet computer in a wireless charging system according to an embodiment of this application.

FIG. 9 is a schematic structural diagram of a tablet computer 100 in a wireless charging system according to an embodiment of this application. As shown in FIG. 9, the tablet computer 100 may include a processor 510, a memory 520, a sensor 530, a display screen 540, a charging interface 550, a charging management module 560, a first wireless charging coil 570, a third wireless charging coil 580, a battery 590, a wireless communication module 500, and the like.

It may be understood that, the structure shown in this embodiment does not constitute a specific limitation on the wireless keyboard 200. In some other embodiments, the wireless keyboard 200 may include more or fewer components than those shown in the figure, or some components may be combined, or some components may be divided, or a different component deployment may be used. The components shown in the figure may be implemented by hardware, software or a combination of software and hardware.

The memory 520 may be configured to store program code, for example, program code used for wirelessly charging the wireless keyboard 200 and/or the electronic stylus 300. The memory 520 may further store a Bluetooth address used for uniquely identifying the tablet computer 100. In addition, the memory 520 may further store connection data of an electronic device that has been successfully paired with the tablet computer 100 before. For example, the connection data may be a Bluetooth address of an electronic device that has been successfully paired with the tablet computer 100. Based on the connection data, the tablet computer 100 may be automatically paired with the electronic device, and it is unnecessary to configure a connection to the electronic device, for example, perform validity verification. The foregoing Bluetooth address may be a media access control (media access control. MAC) address.

The processor 510 may be configured to execute the foregoing application program code, and invoke related modules to implement functions of the tablet computer 100 in the embodiments of this application, such as a forward wireless charging function and a wireless communication function of the tablet computer 100. The processor 510 may include one or more processing units. Different processing units may be independent devices, or may be integrated into one or more processors 510. The processor 510 may be specifically an integrated control chip, or may be formed by a circuit including various active and/or passive components, and the circuit is configured to perform the functions of the processor 510 described in this embodiment of this application. The processor of the tablet computer 100 may be a microprocessor.

The wireless communication module 500 may be configured to support data exchange of wireless communication between the tablet computer 100 and other electronic devices, including Bluetooth (bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), near field communication (near field communication, NFC), an infrared (infrared, IR) technology, and the like.

In some embodiments, the wireless communication module 500 may be a Bluetooth chip. The tablet computer 100 may pair with and establish a wireless connection to Bluetooth chips of other electronic devices through the Bluetooth chip, to implement wireless communication between the tablet computer 100 and other electronic devices through the wireless connection.

In addition, the wireless communication module 500 may further include an antenna. The wireless communication module 500 receives an electromagnetic wave through the antenna, performs frequency modulation and filtering processing on an electromagnetic wave signal, and sends a processed signal to the processor 510. The wireless communication module 500 may further receive a to-be-sent signal from the processor 510, perform frequency modulation and amplification on the to-be-sent signal, and convert the signal into an electromagnetic wave for radiation through the antenna.

In some embodiments, the tablet computer 100 may support wired charging. Specifically, the charging management module 560 may receive a charging input from a wired charger through the charging interface 550, to charge the battery 590.

In some other embodiments, the tablet computer 100 may support the function of wirelessly charging the wireless keyboard 200 and/or the electronic stylus 300. The charging management module 560 may input electrical signals into the first wireless charging coil 570 and/or the third wireless charging coil 580. Specifically, the first wireless charging coil 570 and the third wireless charging coil 580 are connected to the charging management module 560 by matching circuits respectively. The first wireless charging coil 570 and/or the third wireless charging coil 580 may generate an alternating electromagnetic field in response to an alternating current electric signal inputted by the charging management module 560, to wirelessly charge the wireless keyboard 200 and/or the electronic stylus 300.

The charging management module 560 may supply power to the tablet computer 100 while managing wireless charging externally. The charging management module 560 receives an input of the battery 590, to supply power to the processor 510, the memory 520, the sensor 530, an external memory, the wireless communication module 500, and the like. The charging management module 560 may be further configured to monitor parameters such as a battery capacity, a battery cycle count and a battery state of health (electric leakage and impedance) of the battery 590. In some other embodiments, the charging management module 560 may be arranged in the processor 510.

The display screen 540 may be integrated with a touch sensor. The tablet computer 100 may receive a control command of a user on the tablet computer 100 through the display screen 540.

It may be understood that, the structure shown in this embodiment of this application does not constitute a specific limitation on the tablet computer 100. The tablet computer may include more or fewer components than those shown in FIG. 9, or two or more components may be combined, or a different component deployment may be used. For example, an outer surface of the tablet computer 100 may further include components such as a key, an indicator (which may indicate states such as a battery level, inbound/outbound and a pairing mode), and a display screen (which may prompt the user of related information). The key may be a physical key or a touch key (used in cooperation with a touch sensor), or the like, and is configured to trigger operations such as power-on, power-off, starting charging and stopping charging.

Figure 10:
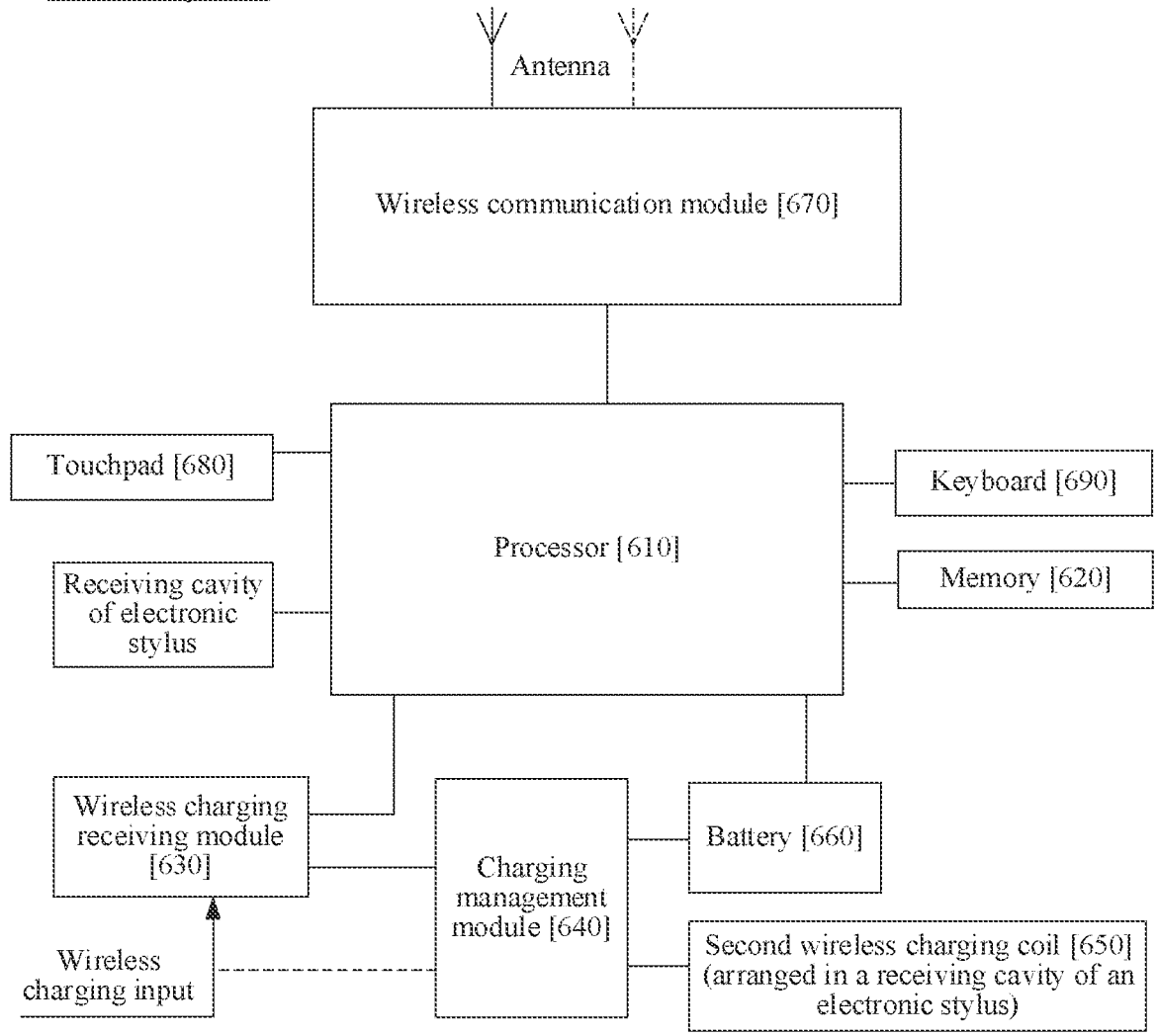
FIG. 10 is a schematic diagram of a hardware structure of a wireless keyboard in a wireless charging system according to an embodiment of this application.

FIG. 10 is a schematic structural diagram of a wireless keyboard 200 in a wireless charging system according to an embodiment of this application. As shown in FIG. 10, the wireless keyboard 200 may include a processor 610, a memory 620, a wireless charging receiving module 630, a charging management module 640, a second wireless charging coil 650, a battery 660, a wireless communication module 670, a touchpad 680, a keyboard 690, and the like.

The processor 610, the memory 620, the wireless charging receiving module 630, the charging management module 640, the battery 660, the wireless communication module 670, the touchpad 680, the keyboard 690, and the like may all be arranged on a keyboard body of the wireless keyboard 200 (for example, the keyboard body A shown in FIG. 1). The wireless charging coil 650 may be arranged in a connecting portion (for example, the connecting portion C shown in FIG. 1) for movably connecting the keyboard body and the bracket.

It may be understood that, the structure shown in this embodiment does not constitute a specific limitation on the wireless keyboard 200. In some other embodiments, the wireless keyboard 200 may include more or fewer components than those shown in the figure, or some components may be combined, or some components may be divided, or a different component deployment may be used. The components shown in the figure may be implemented by hardware, software or a combination of software and hardware.

The memory 620 may be configured to store program code, for example, program code used for wirelessly charging the electronic stylus 300. The memory 620 may further store a Bluetooth address used for uniquely identifying the wireless keyboard 200. In addition, the memory 620 may further store connection data of an electronic device that has been successfully paired with the wireless keyboard 200 before. For example, the connection data may be a Bluetooth address of an electronic device that has been successfully paired with the wireless keyboard 200. Based on the connection data, the wireless keyboard 200 may be automatically paired with the electronic device, and it is unnecessary to configure a connection to the electronic device, for example, perform validity verification. The foregoing Bluetooth address may be a media access control (media access control, MAC) address.

The processor 610 may be configured to execute the foregoing application program code, and invoke related modules to implement functions of the wireless keyboard 200 in the embodiments of this application, such as a forward wireless charging function, a reverse wireless charging function, and a wireless communication function of the wireless keyboard 200. The processor 610 may include one or more processing units. Different processing units may be independent devices, or may be integrated into one or more processors 610. The processor 610 may be specifically an integrated control chip, or may be formed by a circuit including various active and/or passive components, and the circuit is configured to perform the functions of the processor 610 described in this embodiment of this application. The processor of the wireless keyboard 200 may be a microprocessor.

The wireless communication module 670 may be configured to support data exchange of wireless communication between the wireless keyboard 200 and other electronic devices, including Bluetooth (bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), near field communication (near field communication, NFC), an infrared (infrared, IR) technology, and the like.

In some embodiments, the wireless communication module 670 may be a Bluetooth chip. The wireless keyboard 200 may be a Bluetooth keyboard. The wireless keyboard 200 may pair with and establish a wireless connection to Bluetooth chips of other electronic devices through the Bluetooth chip, to implement wireless communication between the wireless keyboard 200 and other electronic devices through the wireless connection.

In addition, the wireless communication module 670 may further include an antenna. The wireless communication module 670 receives an electromagnetic wave through the antenna, performs frequency modulation and filtering processing on an electromagnetic wave signal, and sends a processed signal to the processor 610. The wireless communication module 670 may further receive a to-be-sent signal from the processor 610, perform frequency modulation and amplification on the to-be-sent signal, and convert the signal into an electromagnetic wave for radiation through the antenna.

In some embodiments, the wireless keyboard 200 may support forward wireless charging. The charging management module 640 may receive a wireless charging input through the second wireless charging coil 650 of the wireless keyboard 200. Specifically, the charging management module 640 is connected to the wireless charging coil 650 by a matching circuit. The second wireless charging coil 650 may be coupled to the first wireless charging coil 570 of the tablet computer 100 to sense an alternating electromagnetic field sent by the first wireless charging coil 570 of the tablet computer 100, to generate an alternating electrical signal. The alternating electrical signal generated by the second wireless charging coil 650 is transmitted to the charging management module 640 through the matching circuit, to wirelessly charge the battery 660.

The charging management module 640 may further supply power to the wireless keyboard 200 while charging the battery 660. The charging management module 640 receives an input of the battery 660, to supply power to the processor 610, the memory 620, an external memory, the wireless communication module 670, and the like. The charging management module 640 may be further configured to monitor parameters such as a battery capacity, a battery cycle count and a battery state of health (electric leakage and impedance) of the battery 660. In some other embodiments, the charging management module 640 may be disposed in the processor 610.

In some other embodiments, the wireless keyboard 200 may support reverse wireless charging. Specifically, the charging management module 640 may further receive an electrical signal input from the wireless charging receiving module 630 or the battery 660, and convert a direct current electric signal inputted by the wireless charging receiving module 630 or the battery 660 into an alternating current electric signal. The alternating current electric signal is transmitted to the second wireless charging coil 650 through a matching circuit. The second wireless charging coil 650 receives the alternating current electric signal to generate an alternating electromagnetic field. A wireless charging coil of another mobile terminal may perform wireless charging by sensing the alternating electromagnetic field. That is, the wireless keyboard 200 may further wirelessly charge another mobile terminal.

It should be noted that, the matching circuit may be integrated in the charging management module 640, and the matching circuit may be alternatively independent of the charging management module 640, which is not limited in this embodiment of this application. FIG. 10 is a schematic diagram of a hardware structure of the wireless keyboard 200 by using an example in which the matching circuit may be integrated in the charging management module 640.

It should be noted that, the wireless charging receiving module 630 may integrate all the functions of the first wireless receiving coil 240 and the first wireless receiving control module 230 shown in FIG. 5A to FIG. 8B. The wireless charging receiving module 630 of the wireless keyboard 200 may be connected to an electronic device such as the tablet computer 100 by a wireless charging apparatus. The electronic device such as the tablet computer 100 may supply power to the wireless keyboard 200.

It should be noted that, in a case that the wireless keyboard 200 shown in FIG. 10 is the wireless keyboard 200 shown in FIG. 5A and FIG. 5B, the charging management module shown in FIG. 10 integrates all the functions of the first charging control module 220 and the second wireless output control module 260 shown in FIG. 5A and FIG. 5B. In a case that the wireless keyboard 200 shown in FIG. 10 is the wireless keyboard 200 shown in FIG. 6A and FIG. 6B, FIG. 7A and FIG. 7B or FIG. 8A and FIG. 8B, the charging management module shown in FIG. 10 integrates all the functions of the first charging control module 220, the second voltage stabilization module 250, and the second wireless output control module 260 shown in FIG. 6A and FIG. 6B, FIG. 7A and FIG. 7B or FIG. 8A and FIG. 8B.

For detailed description of performing the forward wireless charging and the reverse wireless charging by the wireless keyboard 200, reference may be made to the description of the principles of the forward wireless charging and the reverse wireless charging of the wireless keyboard 200 in the foregoing embodiments, and details are not described again in this embodiment of this application.

The touchpad 680 is integrated with a touch sensor. The notebook computer may receive a control command of the user on the notebook computer through the touchpad 680 and the keyboard 690.

It may be understood that, the structure shown in this embodiment of this application does not constitute a specific limitation on the wireless keyboard 200. The tablet computer may include more or fewer components than those shown in FIG. 10, or two or more components may be combined, or a different component deployment may be used. For example, a receiving cavity 201 for receiving the electronic stylus 300 may be further arranged on a housing of the wireless keyboard 200. The second wireless charging coil 650 is arranged in the receiving cavity 201, and is configured to wirelessly charge the electronic stylus 300 after the electronic stylus 300 is received in the receiving cavity 201.

In another example, an outer surface of the wireless keyboard 200 may further include components such as a key, an indicator (which may indicate states such as a battery level, inbound/outbound and a pairing mode), and a display screen (which may prompt the user of related information). The key may be a physical key or a touch key (used in cooperation with a touch sensor), or the like, and is configured to trigger operations such as power-on, power-of, starting charging and stopping charging.

Each wireless keyboard 200 provided in the following embodiments may include the foregoing hardware structure. The wireless keyboard 200 provided in the embodiments of this application is described in detail in this embodiment of this application.

An embodiment of this application provides a wireless keyboard 200. As shown in FIG. 1, FIG. 3 or FIG. 4, the wireless keyboard 200 includes a keyboard body A, a bracket B for placing the tablet computer 100, and a connecting portion C for movably connecting the keyboard body A and the bracket B.

The connecting portion C includes a receiving cavity 201 provided with an opening 202 at an end. The receiving cavity 201 is used for receiving the electronic stylus 300 shown in FIG. 2 through the opening 202.

In some embodiments, the connecting portion C shown in FIG. 1 or FIG. 7A and FIG. 7B may include a flexible connector $C_1$ and a receiving component $C_2$. As shown in FIG. 1, the flexible connector $C_1$ is used for bending to movably connect the keyboard body A and the bracket B. For example, the flexible connector $C_1$ may be made of a flexible foldable material.

As shown in FIG. 1, the receiving component $C_2$ is fixed in a bending area of the flexible connector $C_1$. The receiving component $C_2$ is hollow inside. An opening 202 is provided at an end of the receiving component $C_1$, to form a receiving cavity 201. A shape of an inner wall of the receiving component $C_2$ (that is, the receiving cavity 201) is similar to a shape of a body of the electronic stylus 300. For example, the inner wall of the receiving component $C_2$ may be in any shape such as a cylinder or a polygonal prism. The receiving component $C_2$ may be made of a plastic material.

Figure 11:
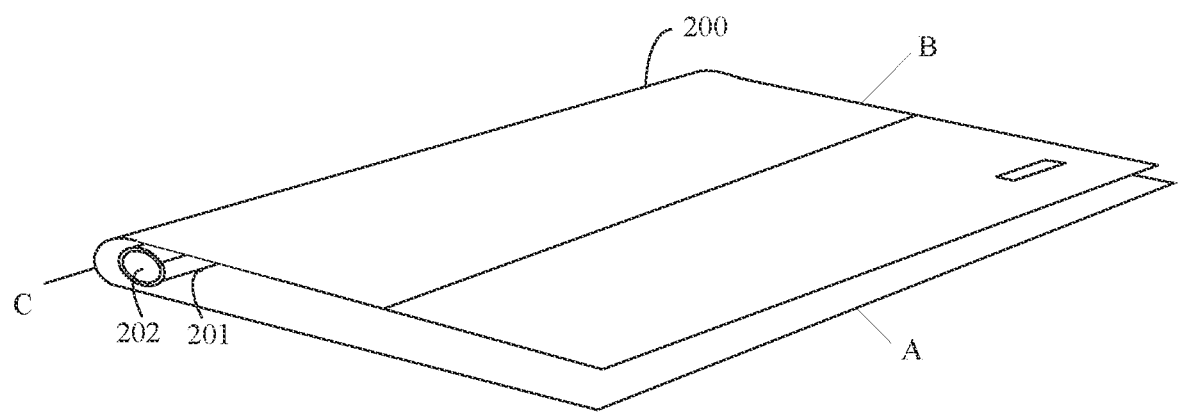
FIG. 11 is a schematic diagram of a product form of another wireless charging system according to an embodiment of this application.
Figure 12:
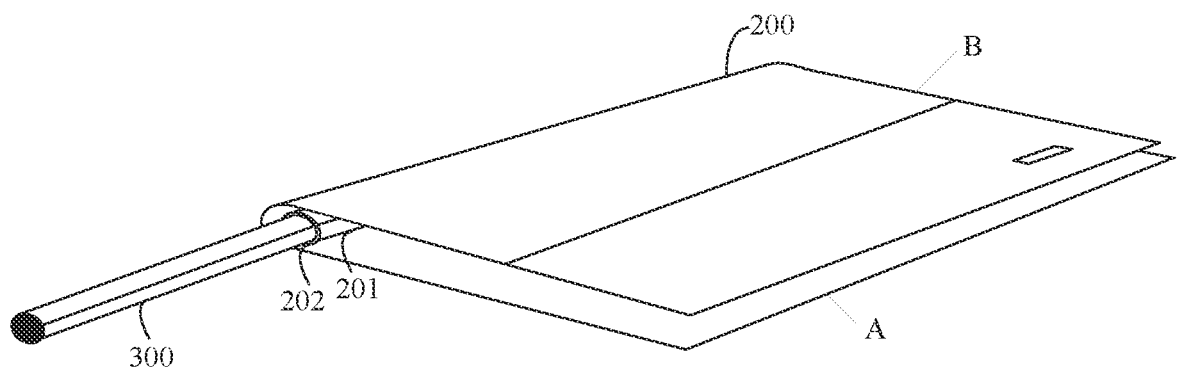
FIG. 12 is a schematic diagram of a product form of another wireless charging system according to an embodiment of this application.
Figure 13:
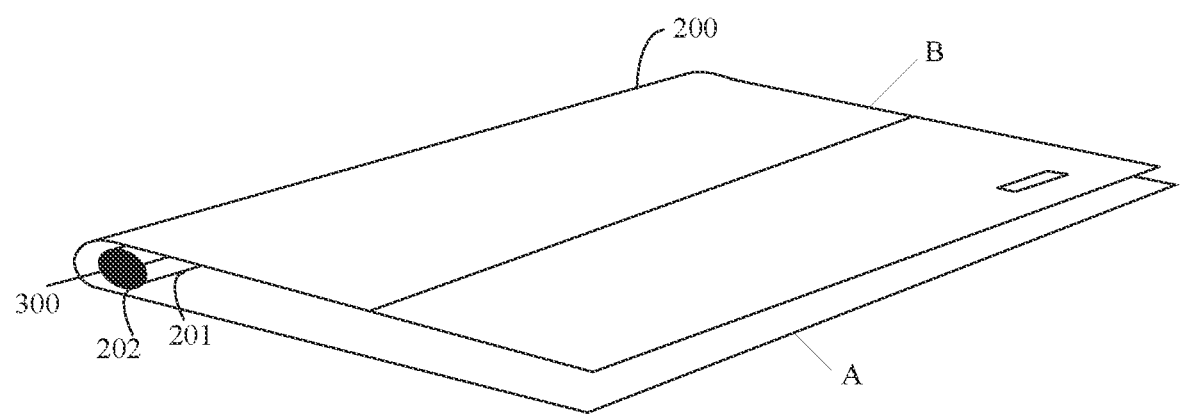
FIG. 13 is a schematic diagram of a product form of another wireless charging system according to an embodiment of this application.

For example, FIG. 11 is a three-dimensional diagram of the wireless keyboard 200 when the keyboard body A and the bracket B of the wireless keyboard 200 are combined and before the electronic stylus 300 is inserted into the receiving cavity 201. FIG. 12 is a three-dimensional diagram of the wireless keyboard 200 when the keyboard body A and the bracket B of the wireless keyboard 200 shown in FIG. 11 are combined and before the electronic stylus 300 is completely inserted into the receiving cavity 201 through the opening 202. FIG. 13 is a three-dimensional diagram of the wireless keyboard 200 when the keyboard body A and the bracket B of the wireless keyboard 200 shown in FIG. 11 are combined and the electronic stylus 300 has been inserted into the receiving cavity 201 through the opening 202.

Figure 14:
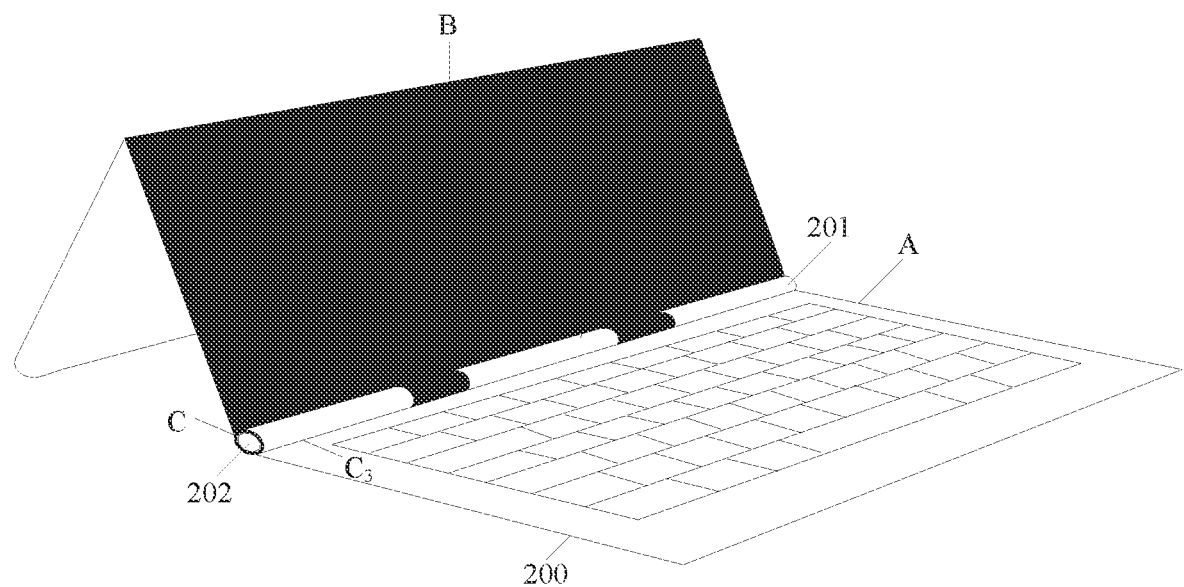
FIG. 14 is a schematic diagram of a product form of a wireless keyboard in a wireless charging system according to an embodiment of this application.

In some other embodiments, FIG. 14 is a schematic diagram of a product form of a wireless keyboard in a wireless charging system. The connecting portion C includes a rotating shaft $C_3$ used for movably connecting the keyboard body A and the bracket B. As shown in FIG. 14, the rotating shaft $C_3$ is hollow inside, and an opening 202 is provided at an end of the rotating shaft $C_3$, to form a receiving cavity 201.

A second wireless output coil 270 is arranged in the receiving cavity 201 described in any foregoing embodiment. The keyboard body A further includes a first wireless receiving coil 240, a first wireless receiving control module 230, and a second wireless output control module 260. As shown in FIG. 5A to FIG. 8B, the second wireless output control module 260 is connected (including a direct connection and an indirect connection) to the first wireless receiving control module 230, and the second wireless output control module 260 is connected to the second wireless output coil 270. For example, the wireless keyboard 200 may include a wireless receiving control chip (for example, an RX chip) and a wireless sending control chip (for example, a TX chip). The first wireless receiving control module 230 may be integrated in a wireless receiving control chip (for example, the TX chip) for implementation. The second wireless output control module 260 may be integrated in the wireless sending control chip (for example, the TX chip) for implementation.

The first wireless receiving control module 230 is configured to rectify an alternating current electric signal generated by the first wireless receiving coil 240 into a direct current electric signal, perform control processing, and then transfer the direct current electric signal to the second battery 210 or the second wireless output control module 260 (or the TX chip).

The second wireless output control module 260 is configured to convert the direct current electric signal into an alternating current electric signal in a case of detecting that the first wireless receiving control module 230 inputs the direct current electric signal, and transmit the alternating current electric signal to the second wireless output coil 270.

The second wireless output coil 270 is configured to generate an alternating electromagnetic field in response to the alternating current electric signal, to wirelessly charge the electronic stylus 300 received in the receiving cavity 201.

In summary, the wireless keyboard 200 provided in the embodiments of this application has the function of receiving the electronic stylus 300 and can wirelessly charge the electronic stylus 300.

In the foregoing embodiment, the direct current electric signal inputted by the first wireless receiving control module 230 provides an energy source for reverse wireless charging. In some other embodiments, the second battery 210 of the wireless keyboard 200 may provide an energy source for reverse wireless charging.

In this embodiment, the second wireless output control module 260 may receive the direct current electric signal from the second battery 210 through the first charging control module 220 in a case of detecting that the electronic stylus 300 is received in the receiving cavity 201 (that is, in-box), and convert the direct current electric signal into an alternating current electric signal. In this case, the second wireless output coil 270 may be configured to generate an alternating electromagnetic field in response to the alternating current electric signal, to wirelessly charge the electronic stylus 300 received in the receiving cavity 201.

Certainly, the second wireless output control module 260 may further stop receiving the direct current electric signal from the second battery 210 in a case of detecting that the electronic stylus 300 is removed from the receiving cavity 201 (that is, out-box). Alternatively, the processor of the wireless keyboard 200 may perform out-box and in-box detection on the electronic stylus 300, and then notify the second wireless output control module 260 of a detection result; or, the processor instructs, according to a detection result, the second wireless output control module 260 to execute a corresponding event.

In this embodiment of this application, for the out-box and in-box detection method for the electronic stylus 3X), reference may be made to an out-box and in-box detection method in a conventional technology, for example, an out-box and in-box detection method for a TWS earphone in a conventional technology, and details are not described in this embodiment of this application.

In this embodiment, no matter whether there is a charging input of the first wireless receiving control module 230, that is, whether the first wireless receiving control module 230 inputs the direct current electric signal, the second battery 210 may provide an energy source to the wireless keyboard 200, to wirelessly charge the electronic stylus 300 received in the receiving cavity 201.

It may be understood that if the second battery 210 provides an energy source for preheating a battery cell, before the second battery 210 starts to be charged, the electricity of the second battery 210 is consumed first. When a quantity of times of charging and discharging of the second battery 210 is larger, the second battery 210 is subject to a higher loss, which affects the service life of the second battery 210.

In addition, in a case that the first wireless receiving control module 230 inputs the direct current electric signal, the direct current electric signal may charge the second battery 210. In this way, in a process of charging the second battery 210, the battery level of the second battery 210 may decrease first and then increase, which easily causes an unnecessary misunderstanding of the user, making the user mistakenly believe that the second battery 210 fails.

Based on the above, in this embodiment of this application, the direct current electric signal inputted by the first wireless receiving control module 230 provides the energy source for preheating the battery cell, to avoid that the user mistakenly believes that the second battery 210 fails, further reduce an unnecessary loss to the second battery 210, and prolong the service life of the second battery 210.

Figure 2:
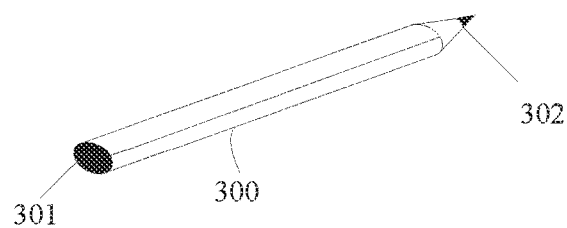
FIG. 2 is a schematic diagram of a product form of an electronic stylus according to an embodiment of this application.

In some other embodiments, a spring device is further arranged in the receiving cavity 201. When the electronic stylus 300 is received in the receiving cavity 201, the spring device is in contact with a second end 302 of the electronic stylus 300. As shown in FIG. 2, a first end 301 of the electronic stylus 300 is an end located at the opening 202 when the electronic stylus 300 is received in the receiving cavity 201. The second end 302 is an end opposite to the first end 301.

The spring device is configured to eject, in response to a press operation performed by a user on the first end 301 of the electronic stylus 300 received in the receiving cavity 201, the electronic stylus 300 from the receiving cavity 201 in a direction from the second end 302 to the first end 301. The spring device helps the user remove the electronic stylus 300 from the receiving cavity 201 of the wireless keyboard 200.

An embodiment of this application further provides a computer storage medium. The computer storage medium includes computer instructions, the computer instructions, when run on the foregoing wireless keyboard 200, causes the wireless keyboard 200 to perform various functions or steps performed by the wireless charging system in the foregoing embodiments.

An embodiment of this application further provides a computer program product. The computer program product, when run on a computer, causes the computer to perform various functions or steps performed by the wireless charging system in the foregoing embodiments.

The foregoing description about implementations allows a person skilled in the art to understand that, for the purpose of convenient and brief description, division of the foregoing functional modules is taken as an example for illustration. In actual application, the foregoing functions can be allocated to different functional modules and implemented according to a requirement, that is, an internal structure of an apparatus is divided into different functional modules to implement all or some of the functions described above.

In the several embodiments provided in this application, it should be understood that the disclosed apparatus and method may be implemented in other manners. For example, the described apparatus embodiment is only an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separate, and components displayed as units may be one or more physical units, may be located in one place, or may be distributed on different places. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk or an optical disc.

The foregoing content is only specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A wireless charging system, comprising a tablet computer, a wireless keyboard, and an electronic stylus, wherein the wireless keyboard comprises a keyboard body, a bracket for placing the tablet computer, and a connecting portion for movably connecting the keyboard body and the bracket;
   the tablet computer is provided with a first battery, a first wireless output control module, and a first wireless output coil, the first wireless output control module is connected to the first battery, and the first wireless output coil is connected to the first wireless output control module;
   the wireless keyboard is provided with a first wireless receiving coil, a first charging control module, a second battery, and a first wireless receiving control module, the first wireless receiving control module is connected to the first wireless receiving coil, the first wireless receiving coil receives an electromagnetic signal sent by the first wireless output coil, the first charging control module is connected to the first wireless receiving control module, and the second battery is connected to the first charging control module;
   the connecting portion comprises a receiving cavity provided with an opening at an end, and the receiving cavity is used for receiving the electronic stylus through the opening;
   a second wireless output control module and a second wireless output coil are arranged in the wireless keyboard, the second wireless output control module is connected to the first wireless receiving control module, and the second wireless output coil is connected to the second wireless output control module; and
   the second wireless output coil is configured to wirelessly charge the electronic stylus received in the receiving cavity.

2. The wireless charging system according to claim 1, wherein the second wireless output coil wirelessly charge the electronic stylus after the wireless keyboard detecting an input of a direct current electric signal.

3. The wireless charging system according to claim 2, wherein the wirelessly charging by the second wireless output coil is disabled by default.

4. The wireless charging system according to claim 1, wherein the first charging control module is connected to the second wireless output module.

5. The wireless charging system according to claim 1, wherein the energy source for the wirelessly charging of the electronic stylus by the second wireless output coil is provided by the direct current signal inputted by the first wireless receiving control module or by the second battery.

6. The wireless charging system according to claim 1, wherein a first voltage stabilization module is arranged on the tablet computer, the first voltage stabilization module is connected to the first battery, and the first wireless output control module is connected to the first voltage stabilization module.

7. The wireless charging system according to claim 6, wherein a third wireless output coil is further arranged in the tablet computer, the third wireless output coil is connected to the first wireless output control module, and the third wireless output coil is configured to wirelessly charge the electronic stylus attracted to the tablet computer.

8. The wireless charging system according to claim 7, wherein a first control switch is arranged between the first wireless output coil and the first wireless output control module, and a second control switch is arranged between the third wireless output coil and the first wireless output control module.

9. The wireless charging system according to claim 8, wherein the second wireless receiving coil is coupled with a second wireless output coil or a third wireless output coil.

10. The wireless charging system according to claim 6, wherein the tablet computer is further provided with a third wireless output control module and a third wireless output coil, the third wireless output control module is connected to the voltage stabilization control module, the third wireless output coil is connected to the third wireless output control module, and the third wireless output coil is configured to wirelessly charge the electronic stylus attracted to the tablet computer.

11. The wireless charging system according to claim 1, wherein the wireless keyboard is provided with a second voltage stabilization module, and the second voltage stabilization module is connected in series between the first wireless receiving control module and the second wireless output control module.

12. The wireless charging system according to claim 11, wherein the functions of the first charging control module, the second voltage stabilization module and the second wireless output control module are integrated into one module.

13. The wireless charging system according to claim 1, wherein the electronic stylus is provided with a third battery, a second charging control module, a second wireless receiving control module and a second wireless receiving coil; the third battery is electrically connected to the second charging control module, and the second charging control module is electrically connected to the second wireless receiving control module, the second wireless receiving control module is electrically connected to the second wireless receiving coil.

14. The wireless charging system according to claim 1, wherein the connecting portion comprises a rotating shaft, and the rotating shaft is used for movably connecting the keyboard body and the bracket; and the rotating shaft is hollow inside, and an opening is provided at an end of the rotating shaft, to form the receiving cavity.

15. The wireless charging system according to claim 1, wherein the connecting portion comprises a flexible connector and a receiving component;

the flexible connector is used for bending to movably connect the keyboard body and the bracket; and the receiving component is fixed in a bending area of the flexible connector, the receiving component is hollow inside, and an opening is provided at an end of the receiving component, to form the receiving cavity.

16. The wireless charging system according to claim 1, wherein a spring device is further arranged in the receiving cavity, wherein when the electronic stylus is received in the receiving cavity, the spring device is in contact with a second end of the electronic stylus; and the spring device is configured to eject, in response to a press operation performed by a user on a first end of the electronic stylus received in the receiving cavity, the electronic stylus from the receiving cavity in a direction from the second end to the first end, wherein the first end is an end located at the opening when the electronic stylus is received in the receiving cavity, and the second end is opposite to the first end.

* * * * *

UNITED STATES PATENT AND TRADEMARK OFFICE
CERTIFICATE OF CORRECTION

PATENT NO. : 12,451,727 B2  
APPLICATION NO. : 17/796233  
DATED : October 21, 2025  
INVENTOR(S) : Yuan Wu et al.

Page 1 of 1

It is certified that error appears in the above-identified patent and that said Letters Patent is hereby corrected as shown below:

On the Title Page

Item (71) (Applicant), In Line 2, Delete "Guangdong" and insert -- Shenzhen --.

Signed and Sealed this  
Thirteenth Day of January, 2026

John A. Squires  
*Director of the United States Patent and Trademark Office*